United States Patent
Lin et al.

(10) Patent No.: US 11,172,449 B2
(45) Date of Patent: Nov. 9, 2021

(54) COMMUNICATION METHOD AND DEVICE

(71) Applicant: HUAWEI TECHNOLOGIES CO., LTD., Guangdong (CN)

(72) Inventors: Bo Lin, Beijing (CN); Xiaolong Guo, Beijing (CN); Shiyong Tan, Beijing (CN); Zhenglei Huang, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 89 days.

(21) Appl. No.: 16/739,960

(22) Filed: Jan. 10, 2020

(65) Prior Publication Data

US 2020/0154357 A1 May 14, 2020

Related U.S. Application Data

(63) Continuation of application No. PCT/CN2018/095704, filed on Jul. 13, 2018.

(30) Foreign Application Priority Data

Jul. 14, 2017 (CN) .......................... 201710576791.6

(51) Int. Cl.
*H04W 52/02* (2009.01)
*H04W 28/06* (2009.01)
(Continued)

(52) U.S. Cl.
CPC ....... *H04W 52/0235* (2013.01); *H04W 76/10* (2018.02); *H04W 4/14* (2013.01); *H04W 80/04* (2013.01); *H04W 84/18* (2013.01)

(58) Field of Classification Search
CPC ... H04W 52/0235; H04W 76/10; H04W 4/14; H04W 80/04; H04W 84/18; H04W 4/70;
(Continued)

(56) References Cited

U.S. PATENT DOCUMENTS

2014/0321452 A1* 10/2014 Choi ................. H04W 74/0833
370/350
2016/0014037 A1 1/2016 Hu et al.
(Continued)

FOREIGN PATENT DOCUMENTS

| CN | 104125654 A | 10/2014 |
|---|---|---|
| CN | 104796849 A | 7/2015 |

(Continued)

OTHER PUBLICATIONS

3GPP TSG RAN WG2#98,R2-1705304 : Discussion on the Relay indication Huawei, HiSilicon Hangzhou, China,15 May 19, 2017 total 3 pages.

(Continued)

*Primary Examiner* — Joseph E Dean, Jr.
(74) *Attorney, Agent, or Firm* — Womble Bond Dickinson (US) LLP

(57) ABSTRACT

A communication method and a device are provided. The method includes: generating, by a first terminal device, first data, where the first data includes second data, the second data includes third data and an identifier of the first terminal device, the second data is data that needs to be reported by the first terminal device to a network device, and the identifier of the first terminal device is used to determine the first terminal device; and sending, by the first terminal device, the first data to a second terminal device when a connection to the network device is not established. Power consumption of the first terminal device can be reduced by using the method and the device in the present disclosure.

20 Claims, 17 Drawing Sheets

(51) Int. Cl.
  *H04W 76/10*    (2018.01)
  *H04W 4/14*     (2009.01)
  *H04W 80/04*    (2009.01)
  *H04W 84/18*    (2009.01)

(58) Field of Classification Search
  CPC ....... H04W 4/06; H04W 4/20; H04W 28/065; H04W 52/0209; H04W 92/10; Y02D 30/70; H04L 9/06; H04L 12/18
  See application file for complete search history.

(56) References Cited

U.S. PATENT DOCUMENTS

| | | | |
|---|---|---|---|
| 2016/0112434 A1* | 4/2016 | Chung | H04L 63/08 726/4 |
| 2017/0181060 A1 | 6/2017 | Wang et al. | |
| 2018/0035419 A1* | 2/2018 | Beattie, Jr. | H04W 72/085 |

FOREIGN PATENT DOCUMENTS

| | | |
|---|---|---|
| CN | 104967595 A | 10/2015 |
| CN | 105471897 A | 4/2016 |
| CN | 106162694 A | 11/2016 |
| EP | 3185619 A1 | 6/2017 |

OTHER PUBLICATIONS

3GPP TS 36.300 V14.3.0 (Jun. 2017);3rd Generation Partnership Project;Technical Specification Group Radio Access Network;Evolved Universal Terrestrial Radio Access (E-UTRA) and Evolved Universal Terrestrial Radio Access Network (E-UTRAN);Overall description;Stage 2(Release 14);total 331 pages.
3GPP TSG-RAN2 Meeting #98 , R2-1704097,:"TP on Layer-2 Relay Data Identification",OPPO,Hangzhou, China, May 15-19, 2017,total 6 pages.

* cited by examiner

COMMUNICATION METHOD AND DEVICE

CROSS-REFERENCE TO RELATED APPLICATIONS

This application is continuation of International Application No. PCT/CN2018/095704, filed on Jul. 13, 2018, which claims priority to Chinese Patent Application No. 201710576791.6, filed on Jul. 14, 2017. The disclosures of the aforementioned applications are hereby incorporated by reference in their entireties.

TECHNICAL FIELD

The present disclosure relates to the field of wireless communication technologies, and in particular, to a communication method and a device.

BACKGROUND

With rapid development of the Internet, the internet of things (IoT) emerges as the times require. The internet of things means that all objects are connected by using a network, to implement intelligent identification, information exchange, and management of any object, any person, any time, and any place.

Currently, as shown in FIG. 1, an entire internet of things system includes an internet of things device, a network device, and an application server. The network device is configured to upload data of the internet of things device to a corresponding application server. For example, the entire internet of things system includes internet of things devices such as a shared bicycle, smart sports shoes, and a band. In this case, the network device may separately upload related data of the smart bicycle, the smart sports shoes, and the band to a shared bicycle server, a smart sports shoe server, and a band server.

It can be learned from the foregoing descriptions that in the prior art, the internet of things device needs to first establish a link connection to the network device, and then transmit related data of the internet of things device to the network device. Consequently, power consumption of the internet of things device is relatively high.

SUMMARY

The present disclosure provides a communication method and a device, to reduce power consumption of a first terminal device.

According to a first aspect, the present disclosure provides a communication method. The method is applied to a first terminal device and includes: generating first data, where the first data includes second data, the second data includes third data and an identifier of the first terminal device, the second data is data that needs to be reported by the first terminal device to a network device, and the identifier of the first terminal device is used to determine the first terminal device; and sending the first data to a second terminal device when a connection to the network device is not established.

In the present disclosure, the first terminal device first generates the first data, and the first data includes the third data that needs to be reported by the first terminal device to the network device. Then, when the connection to the network device is not established, the first terminal device sends the first data to the second terminal device, and when receiving the first data, the second terminal device reports the third data in the first data to the network device. It can be learned from the foregoing descriptions that in the present disclosure, the first terminal device can transmit the to-be-reported third data to the network device without establishing the connection to the network device, thereby reducing power consumption of the first terminal device.

In one embodiment, the generating first data includes: encapsulating the third data by using a first protocol, to generate the second data, where the first protocol is a transmission management layer TML protocol or a non-access stratum NAS protocol; and encapsulating the second data by using a second protocol, to generate the first data, where the second protocol is at least one of an adaptor layer protocol and an access stratum protocol.

In one embodiment, the first data further includes a first indication, the first indication is used to indicate a manner in which the second terminal device sends the second data, and the manner is at least one of a non-access stratum NAS signaling manner, a short message service SMS manner, and an IP data packet manner.

In the present disclosure, the first terminal device may indicate the manner in which the second terminal device sends related data, and the manner includes the NAS signaling manner, the SMS manner, the IP data packet manner, and the like, so that the first terminal device can flexibly report the related data and can control a data reporting manner.

In one embodiment, the first data further includes a second indication, and the second indication is used to indicate a maximum allowable delay time for sending the second data by the second terminal device.

In the present disclosure, the first terminal device can also control a time of the second terminal device by using the second indication, to ensure timely reporting of the first data, and reduce a reporting delay of the first data.

In one embodiment, the sending the first data to a second terminal device when a connection to the network device is not established includes: sending the first data to the second terminal device by using a broadcast channel when the connection to the network device is not established.

In the present disclosure, the first terminal device sends the first data in a broadcast manner, and the first terminal device does not need to establish a dedicated connection to the second terminal device, thereby reducing signaling processes, and reducing power consumption of the first terminal device and the second terminal device. In addition, in the broadcast manner, regardless of which second terminal device receives the first data, the second terminal device can help the first terminal device transmit the data to the network device, thereby increasing a success rate. In addition, because the first terminal device sends the first data by using a low-power-consumption air interface and/or a short-range air interface, energy consumption may be greatly reduced compared with cellular communication.

In one embodiment, the identifier of the first terminal device is pre-allocated by a core network device to the first terminal device.

In one embodiment, the second data further includes an SN sequence number, and the SN sequence number is used to identify the second data.

In one embodiment, the second data further includes a check value, and the check value is used to check whether the second data is modified in a process of transmitting the second data to the network device.

In one embodiment, the first data further includes a public land mobile network PLMN identifier of the first terminal device.

According to a second aspect, the present disclosure provides a communication method. The method is applied to a second terminal device and includes: receiving first data sent by a first terminal device, where the first data includes second data, the second data includes third data and an identifier of the first terminal device, the second data is data that needs to be reported by the first terminal device to a network device, and the identifier of the first terminal device is used to determine the first terminal device; and processing the first data, to obtain the second data; processing the second data, to obtain fourth data, where the fourth data includes the second data and a third indication; and sending the fourth data to a first network device by using a first connection, where the first connection is a connection between the second terminal device and the first network device, and the third indication is used to instruct the first network device to send the second data to a second network device; or sending the fourth data to a third network device by using a second connection, where the second connection is a connection between the second terminal device and the third network device, and the third indication is used to indicate that the fourth data includes the second data.

In one embodiment, the first data further includes a first indication, the first indication is used to indicate a manner in which the second terminal device sends the second data, and the manner is at least one of a NAS signaling manner, an SMS manner, and an IP data packet manner; and the processing the second data, to obtain fourth data includes: when the first indication is the NAS signaling manner, processing the second data based on a NAS protocol, to generate the fourth data, where the fourth data is NAS signaling; when the first indication is the SMS manner, processing the second data based on an SMS protocol, to generate the fourth data, where the fourth data is an SMS; or when the first indication is the IP data packet manner, processing the second data based on an IP protocol, to generate the fourth data, where the fourth data is an IP data packet.

In one embodiment, the first connection is a control plane connection between the second terminal device and the first network device, and the control plane connection is used to transmit at least one of the NAS signaling and the SMS; and the sending the fourth data to a first network device by using a first connection includes: sending the fourth data to the first network device by using the control plane connection, where the fourth data is the NAS signaling or the SMS.

In one embodiment, the first connection is a user plane connection between the second terminal device and the first network device, and the user plane connection is used to transmit the IP data packet; and the sending the fourth data to a first network device by using a first connection includes: sending the fourth data to the first network device by using the first connection, where the fourth data is the IP data packet.

In one embodiment, the first data further includes a second indication, and the second indication is used to indicate a maximum allowable delay time for sending the second data by the second terminal device; and the sending the fourth data to a first network device by using a first connection includes: sending, by using the first connection, the fourth data including the second data to the first network device within the maximum allowable delay time indicated by the second indication.

In one embodiment, the second connection is a control plane connection between the second terminal device and the third network device, and the control plane connection is used to transmit at least one of the NAS signaling and the SMS; and the sending the fourth data to a third network device by using a second connection includes: sending the fourth data to the third network device by using the control plane connection, where the fourth data is the NAS signaling or the SMS.

In one embodiment, the second connection is a user plane connection between the second terminal device and the third network device, and the user plane connection is used to transmit the IP data packet; and the sending the fourth data to a third network device by using a second connection includes: sending the fourth data to the third network device by using the user plane connection, where the fourth data is the IP data packet.

In one embodiment, the first data further includes a second indication, and the second indication is used to indicate a maximum allowable delay time for sending the second data by the second terminal device; and the sending the fourth data to a third network device by using a second connection includes: sending, by using the second connection, the fourth data including the second data to the third network device within the maximum allowable delay time indicated by the second indication.

In one embodiment, the first data further includes a PLMN identifier of the first terminal device; and the sending the fourth data to a third network device by using a second connection includes: when the PLMN identifier of the first terminal device included in the first data and a PLMN identifier of the second terminal device meet a preset condition, sending the fourth data to the third network device by using the second connection.

In one embodiment, the receiving first data sent by a first terminal device includes: receiving, on a broadcast channel, the first data sent by the first terminal device.

According to a third aspect, the present disclosure provides a communication method. The method is applied to a first network device and includes: receiving, by using a first connection, fourth data sent by a second terminal device, where the first connection is a connection between the second terminal device and the first network device; generating fifth data when determining that the fourth data includes a third indication, where the fifth data includes the second data, the second data includes third data and an identifier of the second terminal device, the second data is data that needs to be reported by a first terminal device to a network device, the identifier of the second terminal device is used to determine the first terminal device that reports the second data, and the third indication is used to instruct the first network device to send the second data to a second network device; and sending the fifth data to the second network device.

In one embodiment, the first connection is a control plane connection between the second terminal device and the first network device, and the control plane connection is used to transmit at least one of NAS signaling and an SMS message; and the receiving, by using a first connection, fourth data sent by a second terminal device includes: receiving, by using the control plane connection, the fourth data sent by the second terminal device, where the fourth data is the NAS signaling or the SMS.

In one embodiment, the first connection is a user plane connection between the second terminal device and the first network device, and the user plane connection is used to transmit an IP data packet; and the receiving, by using a first connection, fourth data sent by a second terminal device includes: receiving, by using the user plane connection, the fourth data sent by the second terminal device, where the fourth data is the IP data packet.

In one embodiment, the fifth data further carries location information of the second terminal device and/or an identifier of the second terminal device, and the location information includes at least one of a cell global identity, latitude and longitude information, a route update area, and a tracking area of the second terminal device.

According to a fourth aspect, the present disclosure provides a communication method. The method is applied to a second network device and includes: receiving fifth data sent by a first network device, where the fifth data includes second data, the second data includes third data and an identifier of a first terminal device, the second data is data that needs to be reported by the first terminal device to the second network device, and the identifier of the first terminal device is used to determine the first terminal device; processing the fifth data, to obtain the second data; processing the second data, to obtain the third data and the identifier of the first terminal device; and determining, based on the identifier of the first terminal device, the first terminal device that reports the second data.

In one embodiment, the processing the fifth data, to obtain the second data includes: processing the fifth data by using a third protocol, to obtain the second data, where the third protocol includes at least one of a GPRS tunneling protocol-user panel GTP-U protocol, a user datagram protocol UDP, and an IP protocol.

In one embodiment, the processing the second data, to obtain the third data and the identifier of the first terminal device includes: processing the second data by using a first protocol, to obtain the third data and the identifier of the first terminal device, where the first protocol is a TML protocol or a NAS protocol.

In one embodiment, the fifth data further includes location information of a second terminal device and/or an identifier of the second terminal device, and the location information includes at least one of a cell global identity, latitude and longitude information, a route update area, and a tracking area of the second terminal device.

In one embodiment, the method further includes: reporting the third data in the second data to an application server corresponding to the first terminal device after determining the first terminal device that reports the second data.

In one embodiment, the second data further includes an SN sequence number, and the SN sequence number is used to identify the second data; and the reporting the third data in the second data to an application server corresponding to the first terminal device after determining the first terminal device that reports the second data includes: determining, based on the SN sequence number and an identifier of a second terminal device after determining the first terminal device that reports the second data, whether the second data is repeatedly received; reporting the third data to the application server corresponding to the first terminal device when determining that the second data is not repeatedly received; and discarding the second data when determining that the second data is repeatedly received.

In one embodiment, the fifth data further includes a check value, and the check value is used to check whether the second data included in the fifth data is modified in a process of transmitting the second data from the first terminal device to the second network device; and the reporting the third data in the second data to an application server corresponding to the first terminal device after determining the first terminal device that reports the second data includes: checking, based on the check value after determining the first terminal device that reports the second data, whether the second data is modified in a process of transmitting the second data from the first terminal device to the second network device; and reporting the third data to the application server corresponding to the first terminal device when determining that the second data is not modified.

According to a fifth aspect, the present disclosure provides a communication method. The method is applied to a third network device and includes: receiving, by using a second connection, fourth data sent by a second terminal device, where the second connection is a connection between the second terminal device and the third network device; processing the fourth data, and obtaining second data when determining that the fourth data includes a third indication, where the second data is data that needs to be reported by a first terminal device to the third network device; processing the second data, to obtain third data and an identifier of the first terminal device, where the identifier of the first terminal device is used to determine the first terminal device, and the third indication is used to indicate that the fourth data includes the second data; and determining, based on the identifier of the first terminal device, the first terminal device that reports the second data.

In one embodiment, the processing the fourth data, and obtaining second data when determining that the fourth data includes a third indication includes: processing the fourth data by using a fourth protocol, to determine whether the fourth data includes the third indication, where the fourth protocol includes at least one of a UDP protocol, an IP protocol, and a NAS protocol; and obtaining the second data from the fourth data when determining that the fourth data includes the third indication.

In one embodiment, the processing the second data, to obtain third data and an identifier of the first terminal device includes: processing the second data by using a first protocol, to obtain the third data and the identifier of the first terminal device, where the first protocol is a TML protocol or a NAS protocol.

In one embodiment, the second connection is a control plane connection between the third network device and the second terminal device, and the control plane connection is used to transmit at least one of NAS signaling and an SMS; and the receiving, by using a second connection, fourth data sent by a second terminal device includes: receiving the fourth data by using the control plane connection, where the fourth data is the NAS signaling or the SMS.

In one embodiment, the second connection is a user plane connection between the third network device and the second terminal device, and the user plane connection is used to transmit an IP data packet; and the receiving, by using a second connection, fourth data sent by a second terminal device includes: receiving the fourth data by using the user plane connection, where the fourth data is the IP data packet.

In one embodiment, the method further includes: reporting the third data in the second data to an application server corresponding to the first terminal device after determining the first terminal device that reports the second data.

In one embodiment, the second data further includes an SN sequence number, and the SN sequence number is used to identify the second data; and the reporting the third data included in the second data to an application server corresponding to the first terminal device after determining the first terminal device that reports the second data includes: determining, based on the SN sequence number and an identifier of a second terminal device after determining the first terminal device that reports the second data, whether the second data is repeatedly received; reporting the third data to the corresponding application server when determining that the second data is not repeatedly received; and discarding the second data when determining that the second data is repeatedly received.

In one embodiment, the second data further includes a check value, and the check value is used to check whether the second data is modified in a process of transmitting the second data from the first terminal device to the third network device; and the reporting the third data in the second data to an application server corresponding to the first terminal device after determining the first terminal device that reports the second data includes: after determining the first terminal device that reports the second data, checking, based on the check value in the second data, whether the second data is modified in a process of transmitting the second data from the first terminal device to the second network device; and reporting the third data in the second data to the application server corresponding to the first terminal device when determining that the second data is not modified.

According to a sixth aspect, the present disclosure provides a communications apparatus. The apparatus may be a terminal device, or may be a chip in a terminal device. The apparatus may include a processing unit and a transceiver unit. When the apparatus is a terminal device, the processing unit may be a processor, and the transceiver unit may be a transceiver. The terminal device may further include a storage unit, and the storage unit may be a memory. The storage unit is configured to store an instruction, and the processing unit executes the instruction stored in the storage unit, so that the terminal device performs the method according to the first aspect or the second aspect. When the apparatus is a chip in a terminal device, the processing unit may be a processor, the transceiver unit may be an input/output interface, a pin, a circuit, or the like. The processing unit executes an instruction stored in a storage unit, so that the terminal device performs the method according to the first aspect or the second aspect. The storage unit may be a storage unit (for example, a register or a cache) in the chip, or may be a storage unit (for example, a read-only memory or a random access memory) outside the chip in the terminal device.

According to a seventh aspect, the present disclosure provides a communications apparatus. The apparatus may be a network device, or may be a chip in a network device. The apparatus may include a processing unit and a transceiver unit. When the apparatus is a network device, the processing unit may be a processor, and the transceiver unit may be a transceiver. The network device may further include a storage unit, and the storage unit may be a memory. The storage unit is configured to store an instruction, and the processing unit executes the instruction stored in the storage unit, so that the network device performs the method according to any one of the third aspect to the fifth aspect. When the apparatus is a chip in a network device, the processing unit may be a processor, the transceiver unit may be an input/output interface, a pin, a circuit, or the like. The processing unit executes an instruction stored in a storage unit, so that the network device performs the method according to any one of the third aspect to the fifth aspect. The storage unit may be a storage unit (for example, a register or a cache) in the chip, or may be a storage unit (for example, a read-only memory or a random access memory) outside the chip in the network device.

According to an eleventh aspect, the present disclosure provides a computer-readable storage medium, configured to store a computer program. The computer program is used to execute an instruction of the method according to any one of the first aspect to the fifth aspect.

According to a twelfth aspect, the present disclosure provides a computer program. The computer program includes a computer instruction, and when the computer instruction is executed by a computer, the computer is enabled to perform the method according to any one of the first aspect to the fifth aspect.

It can be learned from the foregoing descriptions that in the present disclosure, the first terminal device first generates the first data, and the first data includes the third data that needs to be reported by the first terminal device to the network device. Then, when a connection to the network device is not established, the first terminal device sends the first data to the second terminal device, and when receiving the first data, the second terminal device reports the third data in the first data to the network device. It can be learned from the foregoing descriptions that in the present disclosure, the first terminal device can transmit the to-be-reported third data to the network device without establishing the connection to the network device, thereby reducing power consumption of the first terminal device.

DESCRIPTION OF EMBODIMENTS

For ease of understanding, descriptions of concepts related to the present disclosure are provided for reference by using an example, shown as follows:

An internet of things (JOT) device is user equipment (UE), and may be a movable terminal device or an unmovable terminal device, and is mainly a device located in the internet of things, for example, a sensor, a shared bicycle, or a smartwatch.

A relay device is user equipment (UE), and may be a movable terminal device or an unmovable terminal device. The device is mainly configured to receive or send service data. The user equipment may be distributed in a network.

The user equipment has different names in different networks, for example, a terminal, a mobile station, a subscriber unit, a station, a cellular phone, a personal digital assistant, a wireless modem, a wireless communications device, a handheld device, a laptop computer, a cordless telephone set, a wireless local loop station, or a vehicle-mounted device. The user equipment may communicate with one or more core networks by using a radio access network (RAN) (an access part of the wireless communications network). For example, the user equipment exchanges voice and/or data with the radio access network.

A network device is a device located on a core network side in a wireless communications network, for example, a network device such as a mobility management entity (MME), a serving GPRS support node (SGSN), a short message center (SMC), an access and mobility management entity (AMF), a service gateway (SGW), a packet data gateway (PGW), or an internet of things gateway (IOT GW).

In the present disclosure, an internet of things device may transmit, to a relay device, data that needs to be reported, and then the relay device transmits the related data to a core network by using an access network. An entire transmission process is: an internet of things device—a relay device—an access network of the relay device—a core network of the relay device—an internet of things gateway. In the present disclosure, a relay device—an access network of the relay device—a core network of the relay device is an existing network framework of the relay device. In the present disclosure, the existing network architecture of the relay device may be used to place the related data of the internet of things device in information, such as non-access stratum (NAS) signaling, a short message service (SMS), and an IP data packet, of the relay device, transmit the information carrying the related data to a core network device, and then transmit the information carrying the related data to an internet of things gateway. The internet of things gateway may be an SGSN, an MME, a short message center, an AMF, an SGW, a PGW, or a dedicated gateway device.

The following describes technical solutions in the present disclosure with reference to the accompanying drawings.

Figure 1:
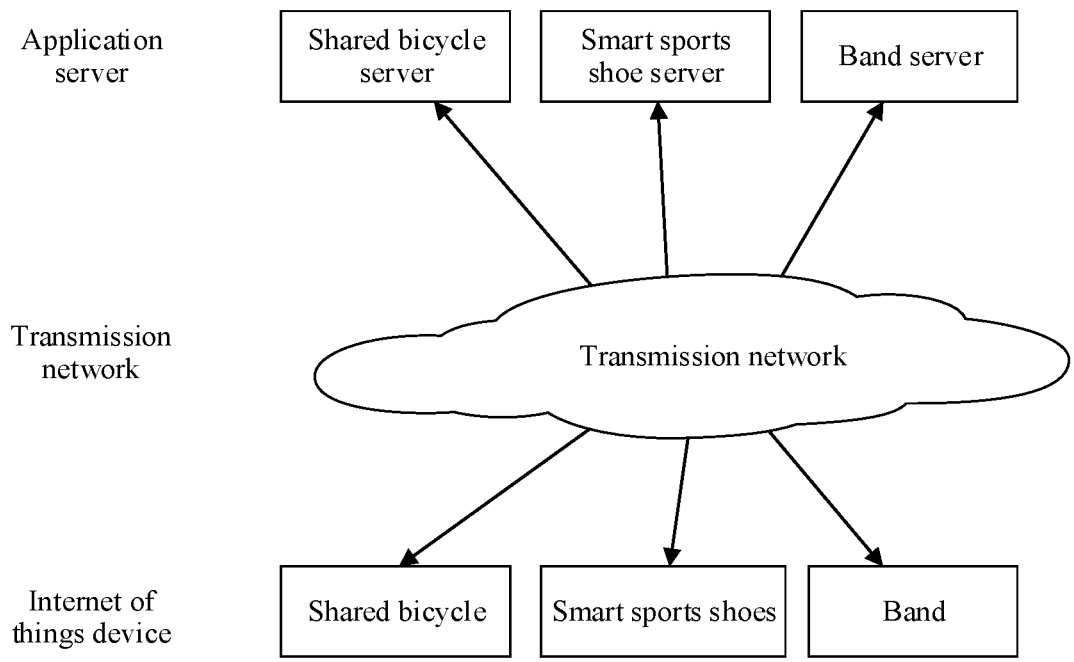
FIG. 1 is a schematic diagram of a communications system in the prior art according to the present disclosure.
Figure 2:
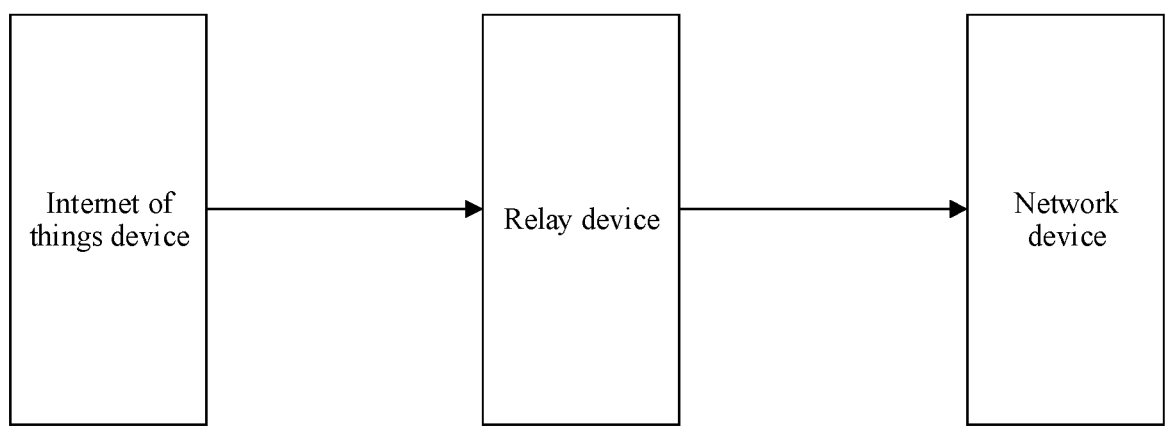
FIG. 2 is another schematic diagram of a communications system according to the present disclosure.

FIG. 2 is a schematic diagram of a possible system network according to the present disclosure. As shown in FIG. 2, in the present disclosure, an internet of things device may transmit, to a relay device, related data that needs to be reported, then a relay device transmits the related data to a network device, and finally, the network device identifies the related data, determines an internet of things terminal that reports the related data, and processes the related data. For example, the network device may report the related data to a server corresponding to the internet of things device.

Figure 3:
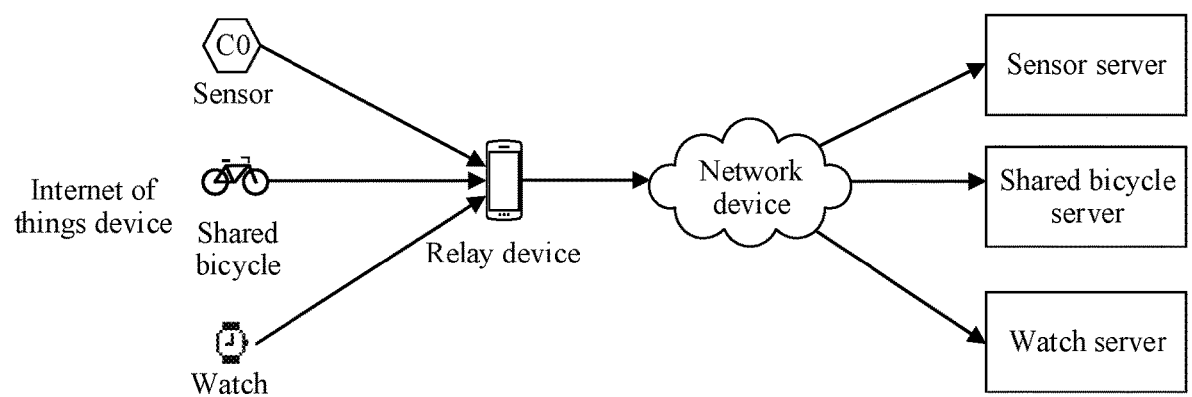
FIG. 3 is still another schematic diagram of a communications system according to the present disclosure.

In one embodiment of the present disclosure, for example, as shown in FIG. 3, the internet of things device includes a sensor, a shared bicycle, a watch, and the like, and the relay device is a smartphone. In this case, the sensor, the shared bicycle, the watch, and the like may transmit, to the relay device, the related data that needs to be reported, and the relay device may transmit the related data to the network device. After receiving related data reported by the relay device, the network device first determines a specific internet of things device that reports the related data. If it is determined that the related data is reported by a sensor, the related data is reported to a sensor server. Similarly, if it is determined that the related data is reported by a shared bicycle, the related data is reported to a shared bicycle server.

There are mainly two solutions in which the relay device transmits the related data of the internet of things device to the network device: A first solution is L3 UE Relay. The internet of things device first establishes a direct inter-device connection to the relay device, then obtains, by using the connection, an IP address assigned by the relay device to the internet of things device, and finally, transmits, to the relay device, the related data carrying the IP address. After the relay device receives the related data, there may be the following two operation manners: In a first operation manner, the relay device first converts an IP address in the related data, converts the IP address in the related data to an IP address of the relay device, and finally, transmits, to the network device, the related data carrying the converted IP address. In a second operation manner, the IP address assigned by the relay device to the internet of things device is an IPv6 address, and the IPv6 address includes six bytes. The first four bytes are allocated by the network device to the relay device, and the last two bytes are allocated by the relay device to the internet of things device. Therefore, the network device cannot identify to which internet of things device the two bytes are allocated. In the second operation manner, after receiving the related data that needs to be reported by the internet of things device, the relay device directly transmits the related data to the network device. In the first solution, because the IP address is assigned by the relay device to the internet of things device, when the network device receives the related data, the network device cannot determine whether the related data is specifically reported by the internet of things device or reported by the relay device, and further, cannot determine a specific internet of things device that reports the related data. Therefore, in the first solution, the network device cannot determine an internet of things device that reports the related data. A second solution is L2 UE Relay. The internet of things device first establishes a direct inter-device connection to the relay device, establishes an RRC connection and a radio bearer with a radio access network by using the relay device, establishes NAS signaling and an EPS bearer of the internet of things device with a core network, and then transmits the related data to the network device by using a bearer of the internet of things device. Before receiving the related data of the internet of things device, the relay device also establishes a dedicated connection to the network device. The dedicated connection also includes a user plane connection and a control plane connection, and the dedicated connection is specially used to transmit data of the internet of things device. In this solution, the network device may distinguish the related data reported by the relay device and related data reported by an Internet of things device. However, in this solution, the internet of things device needs to establish a dedicated RRC connection and a radio bearer, NAS signaling, and an EPS bearer. Consequently, data overheads of the relay device are relatively high.

Based on the foregoing descriptions, the present disclosure provides a communication method, and a principle is: A core network device pre-allocates an identifier to each internet of things device, and then the internet of things device adds the identifier to related data when reporting the related data. A specific process is as follows: First, the internet of things device sends, to the relay device, the related data that needs to be reported, and the related data carries the identifier of the internet of things device; when receiving the related data sent by the internet of things device, the relay device reports the related data to the network device by using a connection (for example, which may be NAS signaling or an EPS bearer) between the relay device and the network device. After receiving the related data, the network device may determine, based on the identifier of the internet of things device carried in the related data, the internet of things device that reports the related data. It can be learned that in the communication method provided in the present disclosure, compared with the first solution, the network device can identify the internet of things device that reports the data, and compared with the second solution, no dedicated connection needs to be established, thereby reducing signaling overheads.

Figure 4A:
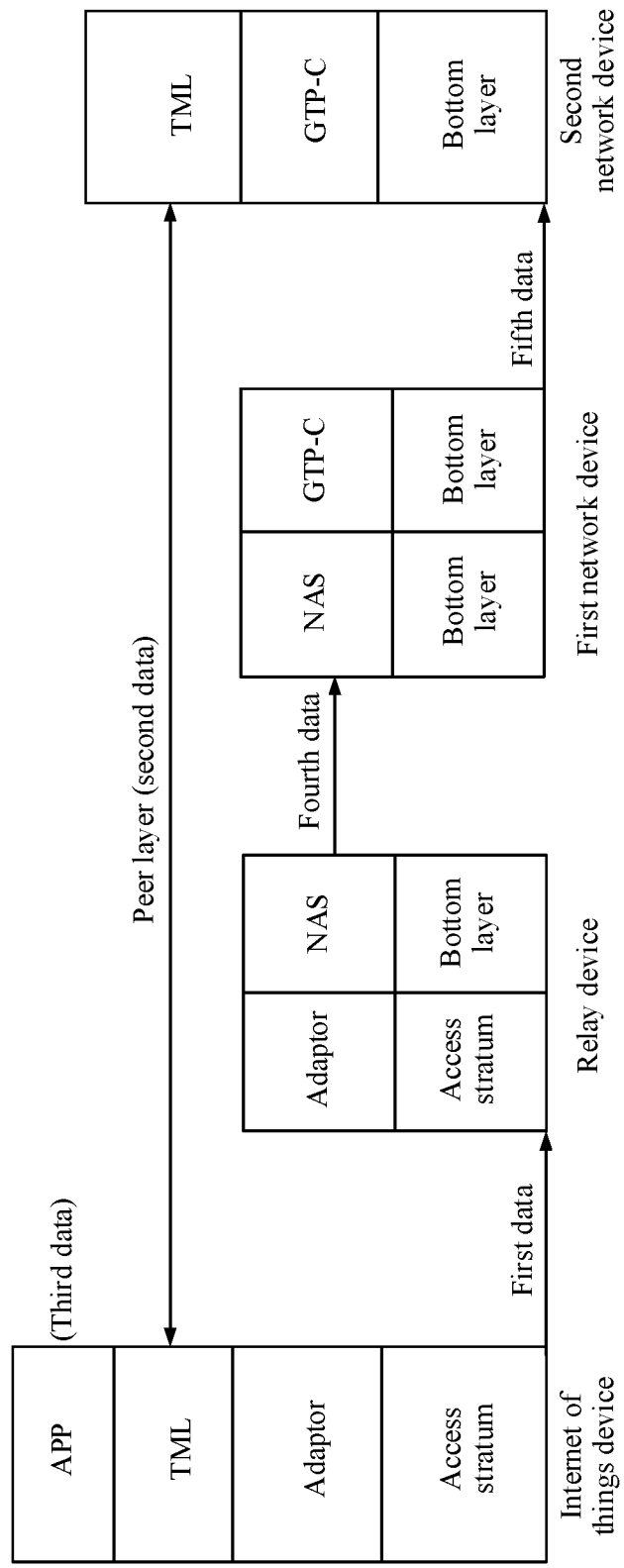
FIG. 4a to FIG. 4h are framework diagrams of a system according to the present disclosure.

FIG. 4a is a diagram of a system framework according to the present disclosure. In the system framework, if an internet of things device needs to report data, encapsulation of an application (APP) layer, a traffic management layer (TML), an adaptor layer, and an access stratum may be sequentially performed on the data, and finally, encapsulated data may be referred to as first data, and is transmitted to a relay device. In the present disclosure, when performing encapsulation of the TML layer, the internet of things device adds an identifier of the internet of things device to the data. After receiving the first data, the relay device may perform decapsulation of the access stratum and the adaptor layer on the first data, to obtain TML layer data. In the present disclosure, the relay device may send, in a NAS signaling manner, the TML layer data to a first network device by using an access network. Specifically, alternatively, a TML PDU may be placed in a NAS message, and the NAS message is sent to the first network device by using the access network. In the present disclosure, the data sent by the relay device to the first network device may be referred to as fourth data. In the present disclosure, after receiving the fourth data, the first network device may obtain the TML layer data, then sequentially perform encapsulation of a GPRS tunneling protocol-control plane (GTP-C) layer and a bottom layer on the TML layer data, to obtain fifth data, and send the fifth data to a second network device. After receiving the fifth data, the second network device may sequentially perform decapsulation of the bottom layer and the GTP-C layer on the fifth data, to obtain a TML layer data packet. Finally, the TML layer data packet is decapsulated by using a TML protocol, to obtain APP layer data and the identifier of the internet of things device.

It should be noted that as shown in FIG. 4a, for a protocol stack of the relay device, the bottom-layer protocol is a lower-layer protocol located at a NAS layer. Likewise, for a protocol stack of the first network device, the bottom-layer protocol is a lower-layer protocol located at a NAS layer or a GTP-C layer. For a protocol stack of the second network device, the bottom-layer protocol is a lower-layer protocol located at a GTP-C layer. In the present disclosure, the bottom-layer protocol may also be referred to as a lower-layer protocol (lower layers).

Figure 4B:
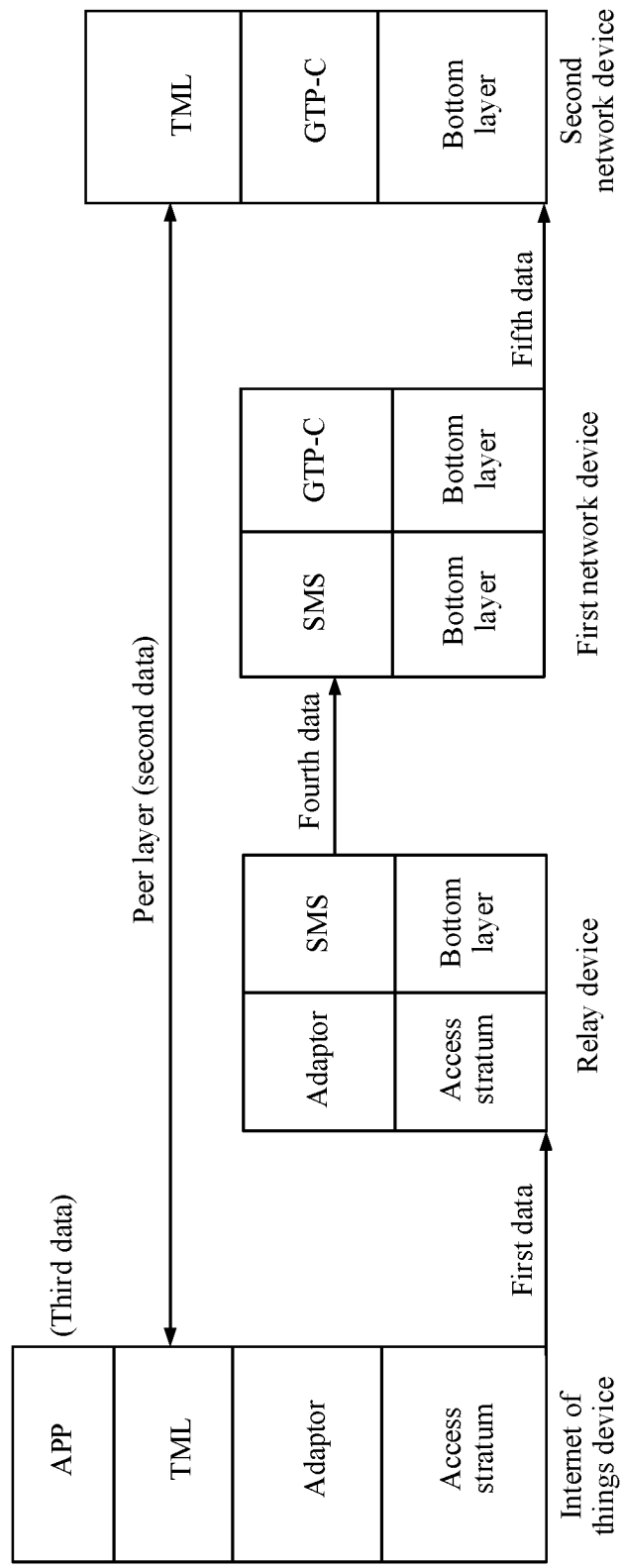

FIG. 4b is another framework diagram of a system according to the present disclosure. In the framework diagram shown in FIG. 4b, a data processing process is similar to that in FIG. 4a. A difference lies in that a relay device sends TML layer data to a first network device by using an SMS method and by using an access network. In the present disclosure, alternatively, a TML PDU may be placed in short message content, and the short message content is sent to the first network device by using the access network.

It should be noted that as shown in FIG. 4b, for a protocol stack of the relay device, the bottom-layer protocol is a lower-layer protocol located at an SMS layer. Likewise, for a protocol stack of the first network device, the bottom-layer protocol is a lower-layer protocol located at an SMS layer or a GTP-C layer.

Figure 4C:
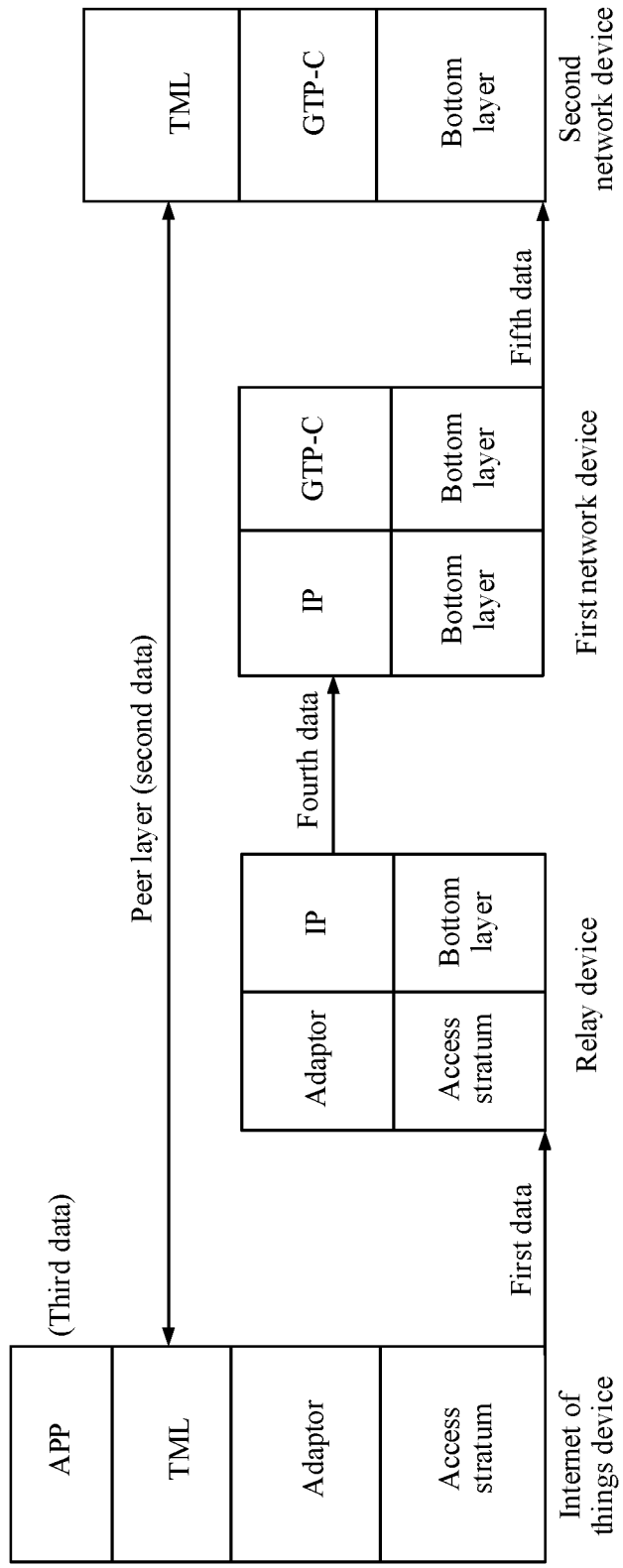

FIG. 4c is another framework diagram of a system according to the present disclosure. In the framework diagram, an internet of things device may generate first data. For a process of generating the first data, refer to the descriptions in FIG. 4a. In addition, the internet of things device sends the first data to a relay device. In the framework diagram, the relay device may send, in an IP data packet manner, TML layer data by using an access network. Specifically, the relay device may encapsulate the TML layer data by using an IP protocol, to generate fourth data. Correspondingly, a first network device and a second network device process the fourth data and fifth data by using a GPRS tunneling protocol-user plane (GTP-U) protocol.

It should be noted that as shown in FIG. 4c, for a protocol stack of the relay device, the bottom-layer protocol is a lower-layer protocol located at an IP layer. Likewise, for a protocol stack of the first network device, the bottom-layer protocol is a lower-layer protocol located at an IP layer or a GTP-U layer. For a protocol stack of the second network device, the bottom-layer protocol is a lower-layer protocol located at a GTP-U layer.

Figure 4D:
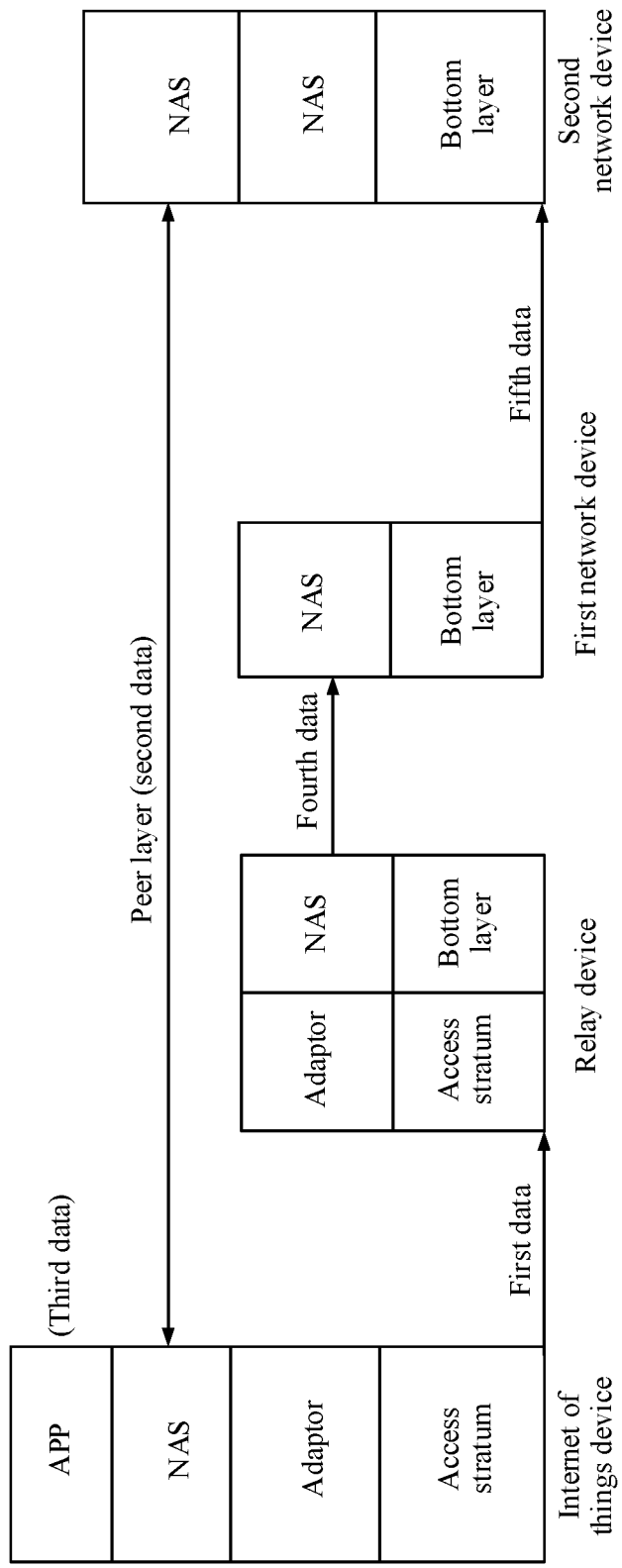

FIG. 4d is another framework diagram of a system according to the present disclosure. In the framework diagram, a peer layer of an internet of things device to a second network device is a NAS layer. A data processing process in FIG. 4d is similar to the data processing process in FIG. 4a. Details are not described herein again.

In the present disclosure, in FIG. 4a, FIG. 4b, and FIG. 4c, the first network device may be a network node such as a mobility management entity (ME), a serving GPRS support node (SGSN), a short message center (SMC), an access and mobility management entity (AMF), a service gateway (SGW), or a packet data gateway (PGW), and the second network device may be an internet of things gateway (IOT GW).

Figure 4E:
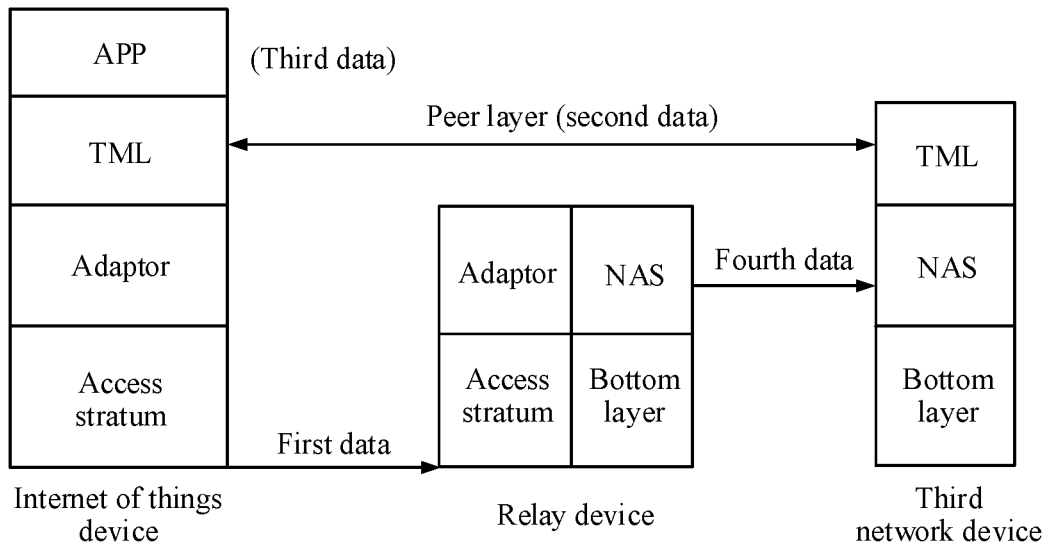

FIG. 4e is another framework diagram of a system according to the present disclosure. In the framework diagram, a first network device and a second device are combined into an entity of a third network device. A data processing process In FIG. 4e is similar to that in FIG. 4a. Details are not described herein again.

Figure 4F:
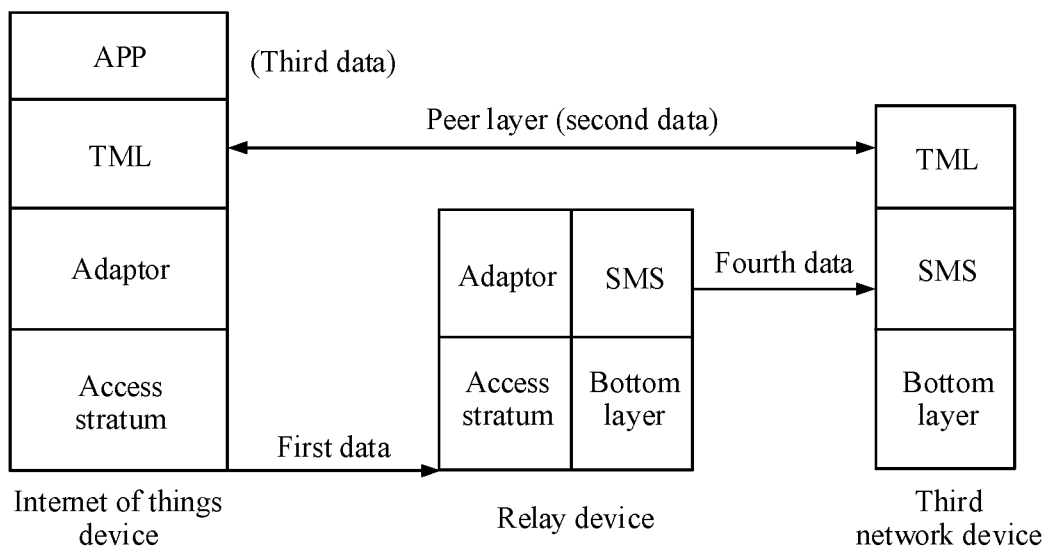

FIG. 4f is another framework diagram of a system according to the present disclosure. In the framework diagram, a first network device and a second device are combined into an entity of a third network device. A data processing process in FIG. 4f is similar to that in FIG. 4b. Details are not described herein again.

Figure 4G:
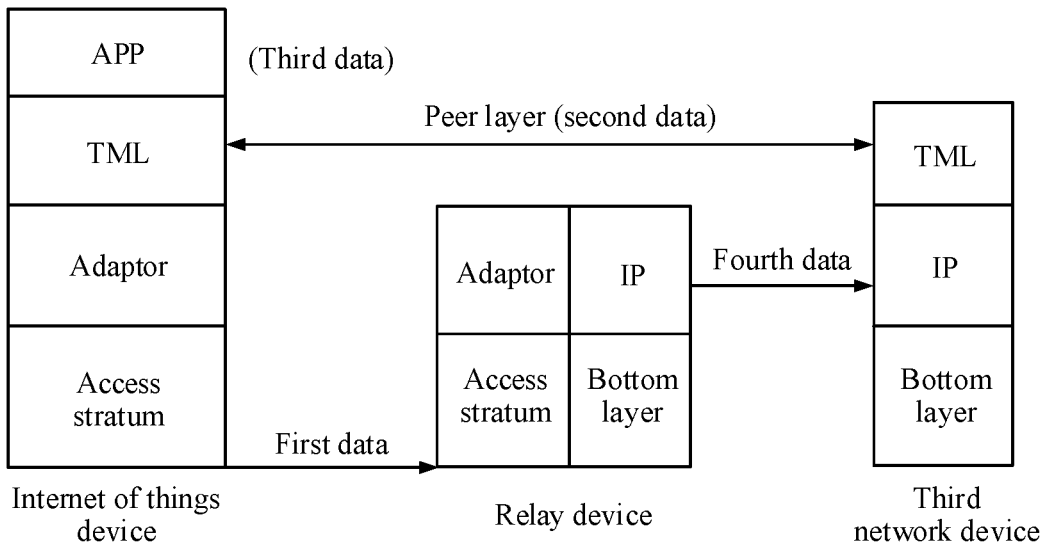

FIG. 4g is another framework diagram of a system according to the present disclosure. In the framework diagram, a first network device and a second device are combined into an entity of a third network device. A data processing process in FIG. 4g is similar to that in FIG. 4c. Details are not described herein again.

Figure 4H:
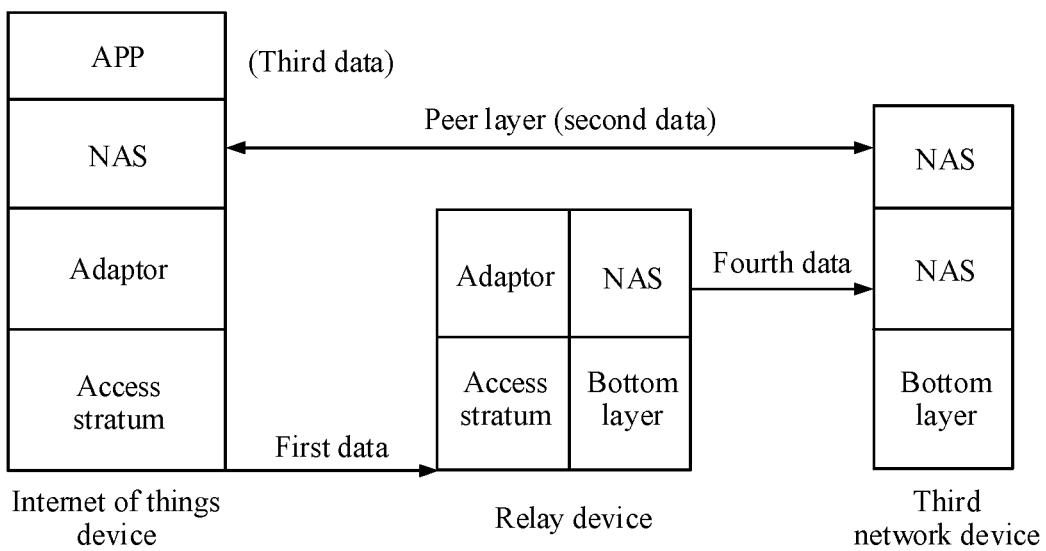

FIG. 4h is another framework diagram of a system according to the present disclosure. In the framework diagram, a first network device and a second device are combined into an entity of a third network device. A data processing process in FIG. 4h is similar to that in FIG. 4d. Details are not described herein again.

Figure 5:
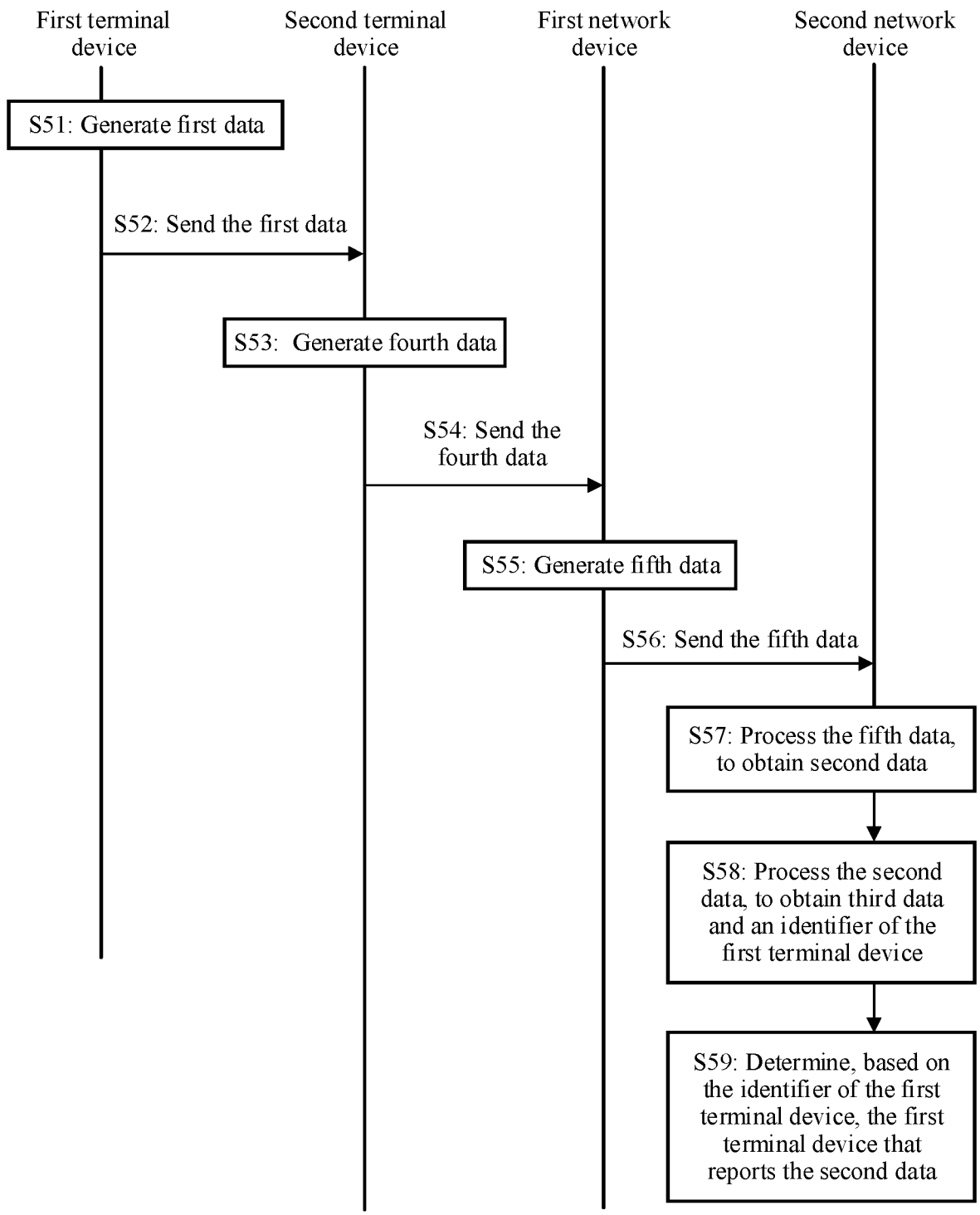
FIG. 5 is a flowchart of a communication method according to the present disclosure.

Based on the system frameworks in FIG. 4a, FIG. 4b, FIG. 4c, and FIG. 4d, as shown in FIG. 5, the present disclosure provides a procedure of a communication method. In the procedure, a first terminal device may correspond to the internet of things device in FIG. 4a, FIG. 4b, FIG. 4c, or FIG. 4d; a second terminal device may correspond to the relay device in FIG. 4a, FIG. 4b, FIG. 4c, or FIG. 4d; a first network device corresponds to the first network device in FIG. 4a, FIG. 4b, FIG. 4c, or FIG. 4d; a second network device corresponds to the second network device in FIG. 4a, FIG. 4b, FIG. 4c, or FIG. 4d. As shown in FIG. 5, the communication method includes the following operations.

Operation S51: The first terminal device generates first data.

Operation S52: The first terminal device sends the first data to the second terminal device when a connection to the second network device is not established.

In the present disclosure, as shown in FIG. 4a, FIG. 4b, or FIG. 4c, the first terminal device may sequentially perform encapsulation of an APP layer, a TML layer, an adaptor layer, and an access stratum on data, to generate the first data. Data generated at the APP layer may be referred to as third data, and data generated at the TML layer may be referred to as second data.

Alternatively, in the present disclosure, as shown in FIG. 4d, the first terminal device may sequentially perform encapsulation of an APP layer, a NAS layer, an adaptor layer, and an access stratum on data, to generate the first data. Data generated at the APP layer may be referred to as third data, and data generated at the NAS layer may be referred to as second data.

In the present disclosure, in FIG. 4a, FIG. 4b, FIG. 4c, or FIG. 4d, a process in which the first terminal device performs encapsulation of the TML layer or the NAS layer on the third data to generate the second data may be as follows: An identifier of the first terminal device is added to the third data, and the identifier of the first terminal device is pre-allocated, to the first terminal device, by a core network, for example, an HSS home subscriber server (HSS) or an ID allocation server. Security processing, for example, encryption and integrity protection, is performed on the third data. An SN sequence number is added to the third data, and the SN sequence number is used to distinguish second data sent by a same first terminal. A check value is added to the third data, and the check value is used to check whether the second data is modified in a process of transmitting the second data to the network device. A PLMN identifier of the first terminal device is added to the third data. An RAT type is added to the third data, and the RAT type is used to indicate a manner in which an access stratum at a bottom layer sends the first data. For example, the RAT type may be any one of Bluetooth, Wi-Fi, ZigBee, an RF ID, D2D, and V2V or another access technology, the access stratum at the bottom layer may send the first data to the second terminal device in a corresponding manner according to the foregoing indication.

It should be noted that, in the present disclosure, the first terminal device may perform all processing at the TML layer, or may perform only partial processing at the TML layer. For example, the first terminal device adds the identifier of the first terminal device only to the third data.

In the present disclosure, as shown in FIG. 4a, FIG. 4b, FIG. 4c, or FIG. 4d, after data processing is completed at the TML layer, to generate the second data, the second data may be transmitted to the adaptor layer, and after the adaptor layer receives the second data, processing of the adaptor layer may be performed on the data, which may be as follows: A first indication is added to second data, the first indication is used to indicate a manner in which the second terminal device sends the second data, and the manner is at least one of a NAS signaling manner, an SMS manner, and an IP data packet manner. A second indication is added to the second data, and the second indication is used to indicate a maximum allowable delay time for sending the second data by the second terminal device, or the second indication may be further used to instruct the second terminal device how to send the second data when the second terminal device obtains the second data. For example, the second data may be immediately sent or sending of the second data may allow to be delayed. If the second data is immediately sent, the second terminal device needs to immediately send the second data after receiving the second data. If the second terminal device is in an RRC idle state in this case, the second terminal device needs to be immediately switched to an RRC connected state to send the second data. If sending of the second data allows to be delayed, the second terminal device may send data of the second terminal device and data of the first terminal device together when the second terminal device is to send the data and is in a connected state. A PLMN identifier is added to the second data, and the PLMN identifier may be specifically obtained from a PLMN identifier added at the TML layer, and the PLMN identifier may be specifically used as a specific condition for determining whether the second terminal device forwards the data. A specific determining process is described in detail in the second terminal device. An air interface connection identifier of the first terminal device or an identifier of the first terminal device, for example, an ID of a Bluetooth device, is added, so that the second terminal device transfers data to the first terminal device. A filter identifier is added, so that the second terminal device filters redundant data. The filter identifier may be specifically the identifier of the first terminal device and a data packet identifier, or may be specifically the identifier of the first terminal device and a random number, or may be specifically a random number. In the present disclosure, the second terminal device may determine, based on the filter identifier, whether data packets are a same data packet sent by the same first terminal device. If the data packets are the same data packet sent by the same first terminal device, the repeated data packet is discarded, and only one of data packets with a same identifier that are sent by the same terminal device is forwarded, thereby reducing power consumption. For the first terminal device at a transmit end, whether the second terminal device can receive information sent by the first terminal device cannot be learned in advance. Therefore, the data packets with the same identifier can be repeatedly sent, to improve a probability of being received.

It should be noted that, in the present disclosure, the first terminal device may perform all processing at the adaptor layer, or may perform only partial processing at the adaptor layer. For example, the first terminal device may add the first indication only to the second data.

It should be noted that, in the present disclosure, the identifier of the first terminal device added to the TML layer may be specifically a credential. The credential may be generated by an IoT GW or generated by an HSS.

In the present disclosure, after data processing is completed at the adaptor layer, data may be sent to an access stratum, and the first data may be generated after processing of the access stratum is further performed on the data at the access stratum. In addition, the first data may be sent to the second terminal device at the access stratum according to an indication of the RAT type. For example, if the indication of the RAT type is Bluetooth, the first data may be sent to the second terminal device in a Bluetooth manner at the access stratum.

In the present disclosure, the first terminal device may transmit the first data to the second terminal device in a broadcast manner.

In this case, the first terminal device does not need to establish a dedicated connection to the second terminal device, thereby reducing signaling processes, and reducing power consumption of the first terminal device and the second terminal device. In addition, in the broadcast manner, regardless of which second terminal device receives the first data, the second terminal device can help the first terminal device transmit the data to the network device, thereby increasing a success rate. In addition, because the first terminal device sends the first data by using a low-power-consumption air interface and/or a short-range air interface, energy consumption may be greatly reduced compared with cellular communication.

Operation S53: The second terminal device generates fourth data.

Operation S54: The second terminal device sends the fourth data to the first network device by using a first connection, where the first connection is a connection between the second terminal device and the first network device.

In the present disclosure, the second terminal device sends the fourth data by using the connection between the second terminal device and the first network device, without establishing a dedicated connection for the first data, thereby reducing signaling overheads of the second terminal device.

In the present disclosure, as shown in FIG. 4a, FIG. 4b, FIG. 4c, or FIG. 4d, after receiving the first data, the second terminal device may first perform decapsulation of the access stratum and the adaptor layer on the first data, to obtain the second data. In addition, the second terminal device obtains a first indication of the first terminal device at the adaptor layer. If the first indication instructs the second terminal device to send the second data in a NAS signaling manner, as shown in FIG. 4a or FIG. 4d, the second terminal device may encapsulate the second data based on a NAS protocol, to generate the fourth data. The fourth data is NAS signaling. The fourth data is sent to a first core network device by using a control plane connection between the second terminal device and the first core network device. If the first indication instructs the second terminal device to send the second data in an SMS manner, as shown in FIG. 4b, the second terminal device may encapsulate the second data by using an SMS protocol, to generate the fourth data. The fourth data is an SMS, and the fourth data is sent to the first core network device by using the control plane connection between the first terminal device and the first core network device. As shown in FIG. 4c, if the first indication instructs the second terminal device to send the second data in an IP data packet manner, the second terminal device may process the second data by using an IP protocol, to generate the fourth data. The fourth data is an IP data packet, and the fourth data is sent to the first core network device by using a user plane connection between the first terminal device and the first core network device.

In the present disclosure, when performing encapsulation of the NAS protocol, the SMS protocol, or the IP protocol on the second data, the second terminal device may specifically add a third indication to the second data. The third indication may be used to indicate that the fourth data includes the second data, or instruct the first network device to forward the fourth data to the second network device.

In the present disclosure, specifically, the second indication may specifically use an explicit manner. For example, the indication information is carried in the message. Alternatively, the second indication may use an implicit manner, for example, a manner agreed on by using a message name or the like.

In the present disclosure, for adding the third indication by using the NAS protocol, the following three manners may be specifically provided, specifically: In a first manner, a dedicated field is added to the NAS protocol, to accommodate the third indication. Both a receiving party and a transmitting party can learn of, through a name of the field, a type of data transmitted in the field, for example, an IoT UE Container. A transmit end places a data packet of IoT UE into the field, and a receive end parses the data packet of the IoT UE after receiving the data packet. In a second manner, two dedicated fields are added to the NAS protocol. One field is used to indicate a data type, for example, IoT UE data, and the other field is used to accommodate the IoT UE data. The transmit end places the data packet of the IoT UE into the field, and the receive end parses the data packet of the IoT UE after receiving the data packet. In a third manner, an IoT UE ID and the IoT UE data may form an adaptor layer. A correspondence between the IoT UE ID and a Relay UE ID may be recorded at the adaptor layer.

It should be noted that, for the first manner and the second manner, an IoT UE ID field may be further added, so that the receive end records the correspondence between the IoT UE ID and the Relay UE ID after receiving the IoT UE ID field.

In the present disclosure, further, the second terminal device may further obtain the second indication when performing decapsulation of the adaptor layer on the first data, and send, by using the first connection, the fourth data including the second data to the first network device within the maximum allowable delay time indicated by the second indication.

In the present disclosure, further, when performing decapsulation of the adaptor layer on the first data, the second terminal device may further obtain the PLMN identifier of the first terminal device, and when the PLMN identifier of the first terminal device and a PLMN identifier of the second terminal device meet the preset condition, then, send the fourth data to the second network device by using the first connection. In the present disclosure, the preset condition may be that the PLMN identifier of the first terminal device is the same as the PLMN identifier of the second terminal device, the PLMN identifier of the first terminal device and the PLMN identifier of the second terminal device have an association relationship during roaming, or the like.

In the present disclosure, the second terminal device may access the first network device by using a radio access network and in a manner such as the cellular-based narrow-band internet of things (NB-IoT), enhanced machine type communication (eMTC), a global system for mobile communications (UMTS), Long Term Evolution (LTE), and new radio (NR), and then send the fourth data.

Operation S55: When determining that the fourth data includes the third indication, the first network device generates fifth data.

In the present disclosure, the data sent by the second terminal device to the first network device may be data of the second terminal device, or may be data of the first terminal device. Therefore, in the present disclosure, as shown in FIG. 4a, FIG. 4b, FIG. 4c, or FIG. 4d, when performing decapsulation of the NAS protocol, the SMS protocol, or the IP protocol on the fourth data, the first network device may determine whether the fourth data includes the third indication, and if the fourth data includes the third indication, determine that the data is reported by the first terminal device, and perform related processing on the data, to generate the fifth data, for example, in FIG. 4a, perform decapsulation of the NAS layer and encapsulation of a GTP-C protocol and a bottom-layer protocol on the fourth data, to generate the fifth data. Then, the fifth data is sent to the second network device. However, in the present disclosure, if determining that the fourth data does not include the third indication, the first network device may determine that the data is reported by the second terminal device. In this case, the data does not need to be reported to the second network device.

In the present disclosure, as shown in FIG. 4a, FIG. 4b, FIG. 4c, or FIG. 4d, when performing encapsulation of the GTP-C protocol or the GTP-U protocol on the data, the first network device may add, to the data, the identifier of the second terminal device, for example, a cell global identifier, longitude and latitude information, a route update area, and a tracking area of the second terminal device. In different embodiments, the first terminal device is usually relatively close to the second terminal device. Therefore, when obtaining location information of the second terminal device, the second network device may approximately consider that location information of the first terminal device is obtained, to facilitate control and management on the first terminal device by the second network device. For example, the second network device may report the location information of the first terminal device to a corresponding application server.

Operation S56: The first network device sends the fifth data to the second network device.

In the present disclosure, when forwarding the second data (the second data may be specifically TML data or NAS data) to the second network device, the first network device may further obtain an identifier of a relay device, and send the identifier of the relay device together with the second data to the second network device. Therefore, the second network device may learn of a specific relay device that helps the internet of things device transmit data, to facilitate subsequent processing on the relay device, for example, charging for the relay device, and fee return and encouragement.

Operation S57: The second network device processes the fifth data, to obtain the second data.

In the present disclosure, as shown in FIG. 4a, FIG. 4b, FIG. 4c, or FIG. 4d, because the second network device has a peer layer to the first terminal device, and the peer layer may be a NAS layer or a TML layer, the second network device can identify and obtain the second data.

In the present disclosure, as shown in FIG. 4a, FIG. 4b, or FIG. 4c, the fifth data may be specifically decapsulated by using the bottom-layer protocol and the GTP-C protocol, to obtain the second data. Alternatively, as shown in FIG. 4d, the fifth data is decapsulated by using the bottom-layer protocol and the GTP-U protocol, to obtain the second data.

Operation S58: The second network device processes the second data, to obtain third data and the identifier of the first terminal device.

In the present disclosure, the second data may be decapsulated by using the NAS protocol or the TML protocol, to obtain the third data and the identifier of the first terminal device.

Operation S59: The second network device determines, based on the identifier of the first terminal device, the first terminal device that reports the second data.

In the present disclosure, after determining the first terminal device that reports the second data, the second network device may report the third data in the second data to an application server corresponding to the first terminal device, for example, when the first terminal device is a shared bicycle, report the third data to a shared bicycle server.

In the present disclosure, the first terminal device adds an SN sequence number, a check value, a security encryption value, and the like to the second data. Therefore, in the present disclosure, after obtaining the second data, the second network device may specifically process the second data based on the SN sequence number, the check value, and the security encryption value. For example, the second network device determines, based on the SN sequence number, whether the second data is repeatedly received, and if the second data is repeatedly received, discards the second data, or if the second data is not repeatedly received, reports the third data corresponding to the second data to the corresponding application server. For another example, the second network device determines, based on the check value, whether the second data is modified in a transmission network, and if the second data is modified, discards the second data, or if the second data is not modified, reports the third data corresponding to the second data to the corresponding application server. For another example, the second network device determines, based on the security encryption value, whether the second data is complete, if the second data is incomplete, discards the second data, and if the second data is complete, then reports the third data in the second data to the corresponding application server. Compared with the prior art, a bearer does not need to be set up in advance and security does not need to be activated in advance, but data is directly sent. Authentication and security are performed only when data is received, thereby reducing signaling and reducing a delay and power consumption.

Figure 6:
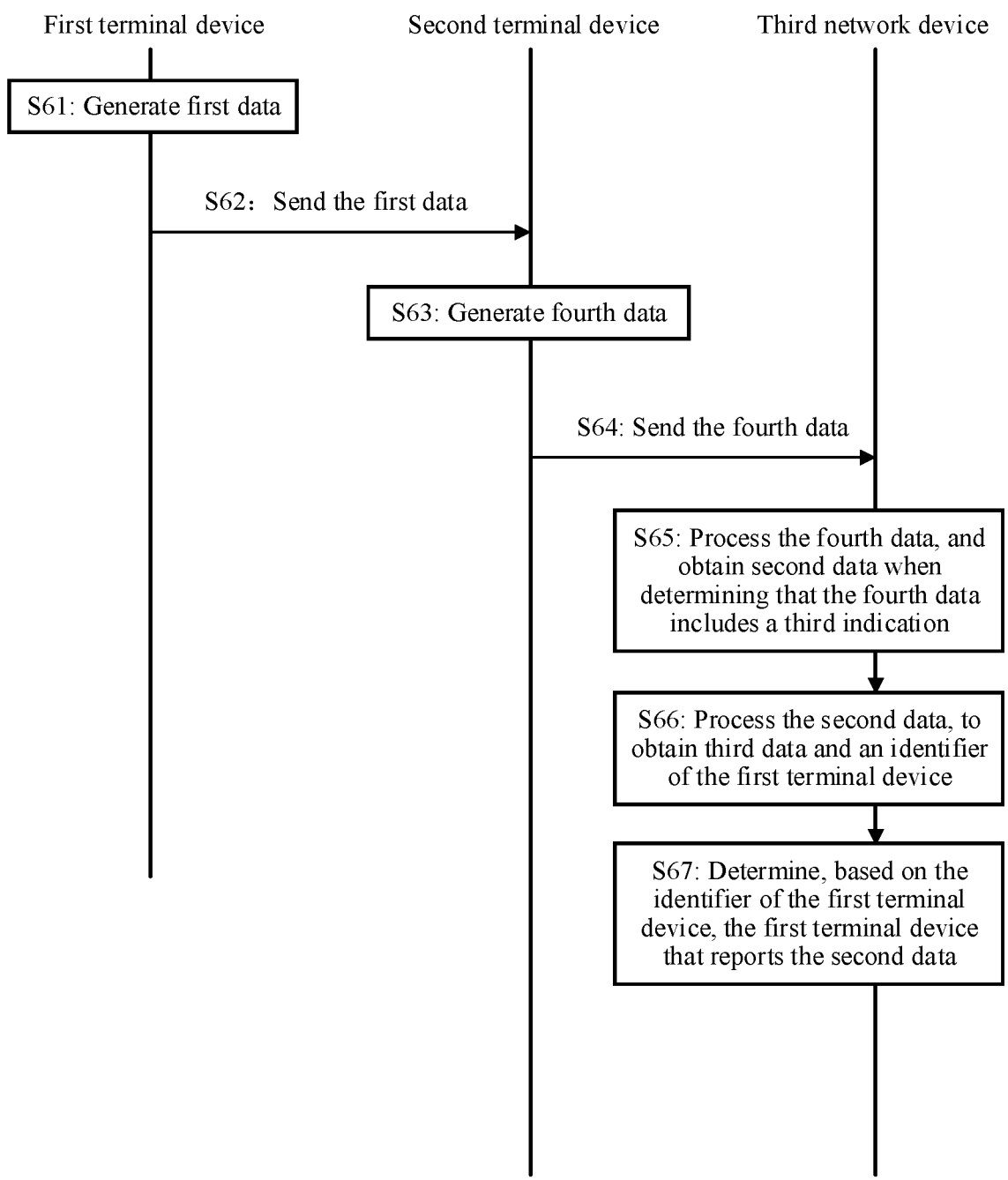
FIG. 6 is another flowchart of a communication method according to the present disclosure.

Based on the system frameworks in FIG. 4e, FIG. 4f, FIG. 4g, and FIG. 4h, as shown in FIG. 6, the present disclosure further provides a procedure of a communication method. In the procedure, a first terminal device may correspond to the internet of things device in FIG. 4e, FIG. 4f, FIG. 4g, and FIG. 4h; a second terminal device may correspond to the relay device in FIG. 4e, FIG. 4f, FIG. 4g, and FIG. 4h; a third network device corresponds to the third network device in FIG. 4e, FIG. 4f, FIG. 4g, and FIG. 4h. As shown in FIG. 6, the communication method includes the following operations.

Operation S61: The first terminal device generates first data.

Operation S62: The first terminal device sends the first data to the second terminal device.

Operation S63: The second terminal device generates fourth data.

Operation S64: The second terminal device sends the fourth data to the third network device.

Implementation processes of operations S61 to S64 are similar to those of operations S51 to S54 in FIG. 5. Refer to related descriptions in FIG. 5. Details are not described herein again.

Operation S65: The third network device processes the fourth data, and when determining that the fourth data includes a third indication, obtains second data, where the third indication is used to indicate that the fourth data includes the second data.

In the present disclosure, the third network device may first process the fourth data by using a fourth protocol, to determine whether the fourth data includes the third indication, and if the fourth data includes the third indication, obtain the second data from the fourth data, or if the fourth data does not include the third indication, end processing.

In the present disclosure, the fourth protocol may be the NAS protocol in FIG. 4e or FIG. 4h, the SMS protocol in FIG. 4f, or the IP protocol in FIG. 4g.

Operation S66: The third network device processes the second data, to obtain third data and an identifier of the first terminal device.

In the present disclosure, the second data may be specifically processed by using a first protocol, to obtain the third data in the second data and the identifier of the first terminal device. The first protocol may be specifically the TML protocol in FIG. 4e, FIG. 4f, or FIG. 4g, or may be the NAS protocol in FIG. 4h.

Operation S67: The third network device determines, based on the identifier of the first terminal device, the first terminal device that reports the second data.

In the present disclosure, the third network device may report the third data in the second data to an application server corresponding to the first terminal device after determining the first terminal device that reports the second data.

In the present disclosure, the first terminal device adds an SN sequence number, a check value, a security encryption value, and the like to the second data. Therefore, in the present disclosure, after obtaining the second data, the third network device may specifically process the second data based on the SN sequence number, the check value, and the security encryption value. For example, the third network device determines, based on the SN sequence number, whether the second data is repeatedly received, and if the second data is repeatedly received, discards the second data, or if the second data is not repeatedly received, reports the third data corresponding to the second data to the corresponding application server. For another example, the third network device determines, based on the check value, whether the second data is modified in a transmission network, and if the second data is modified, discards the second data, or if the second data is not modified, reports the third data corresponding to the second data to the corresponding application server. For another example, the third network device determines, based on the security encryption value, whether the second data is complete, if the second data is incomplete, discards the second data, and if the second data is complete, then reports the third data in the second data to the corresponding application server.

It can be learned from the foregoing descriptions that the relay device transmits the fourth data to a network device by using an access network. In the present disclosure, how the relay device transmits the fourth data to a first core network device by using the access network is described in detail.

Figure 7A:
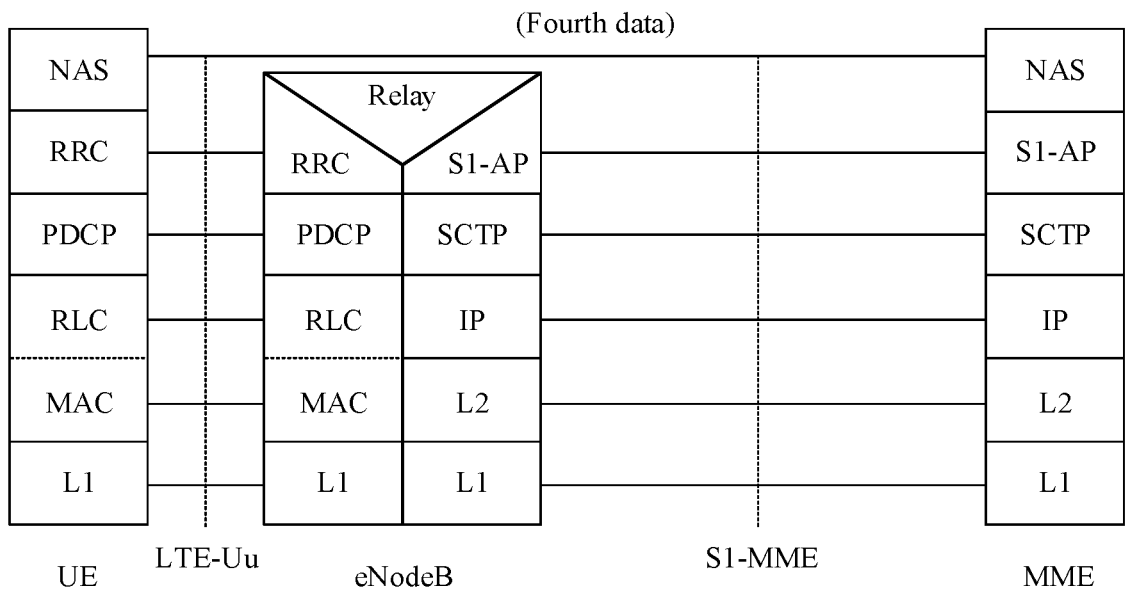
FIG. 7a is a block diagram of a system according to the present disclosure.

Based on the system framework shown in FIG. 4a, as shown in FIG. 7a, the present disclosure provides a specific protocol framework. Fourth data in the protocol framework is specifically NAS signaling. In FIG. 7a, UE shown may correspond to the relay device in FIG. 4a; an MME corresponds to the first network device in FIG. 4a; the access network device is an eNodeB.

Specifically, referring to FIG. 7a, protocols on a UE side may be specifically NAS, RRC, PDCP, RLC, MAC, and L1 protocols. Peer protocols between an eNodeB side and UE are RRC, PDCP, RLC, MAC, and L1 protocols, and peer protocols between the eNodeB side and an MME are S1-AP, SCTP, IP, L2, and L1 protocols. In the present disclosure, an interface between the UE and the eNodeB may be specifically an LTE-Uu interface, and an interface between the eNodeB and the MME may be specifically an S1-MME interface.

Figure 7B:
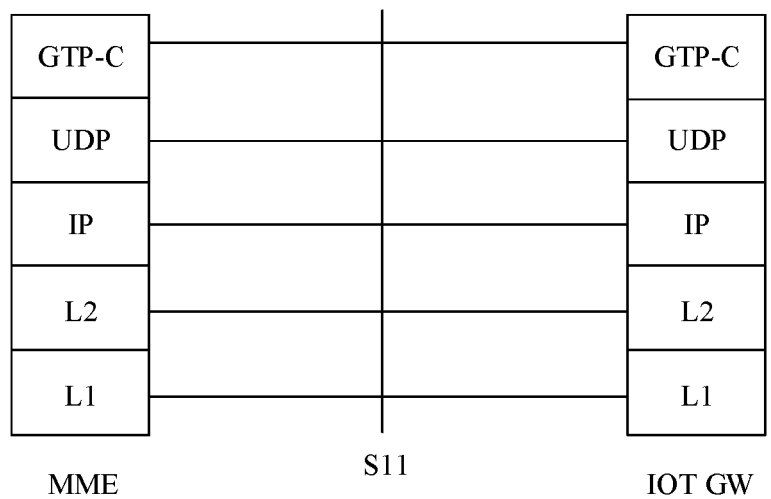
FIG. 7b is another block diagram of a system according to the present disclosure.

In the present disclosure, as shown in FIG. 7b, a specific protocol framework is provided. The protocol framework may be specifically applied to communication between the first network device and the second network device. As shown in FIG. 7b, the first network device may be specifically an MME, the second network device may be specifically an IOT GW, and peer protocols between the MME and the S-GW are L1, L2, IP, UDP, and GTP-C. An interface between the MME and the S-GW is an SII interface.

In the present disclosure, in FIG. 4a, bottom-layer protocols of the NAS layer in the relay device may be specifically RRC, PDCP, RLC, MAC, and L1 protocols, bottom-layer protocols of the NAS layer in the first network device may be specifically S1-AP, SCTP, IP, L2, and L1 protocols, and bottom-layer protocols of the GTP-C layer in the first network device may be specifically UDP, IP, L2, and L1 protocols.

Figure 8:
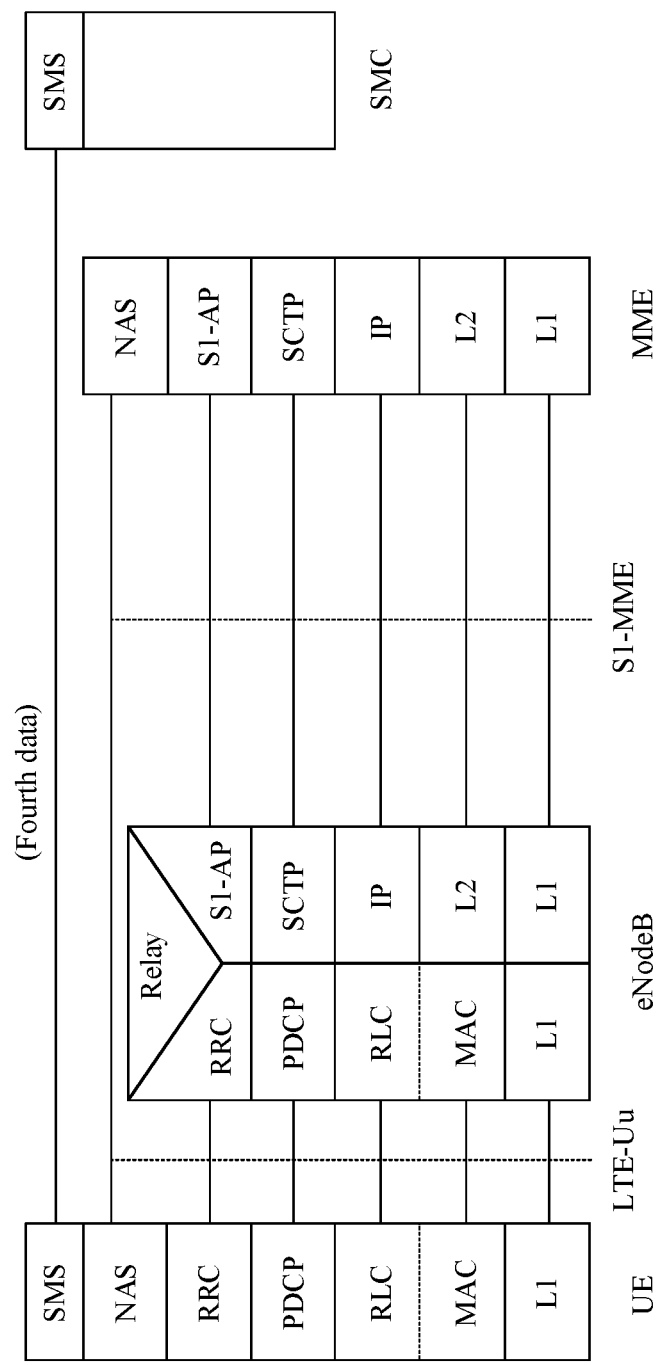
FIG. 8 is still another block diagram of a system according to the present disclosure.

Based on the system framework shown in FIG. 4b, as shown in FIG. 8, the present disclosure provides a specific protocol framework. Fourth data in the protocol framework is specifically an SMS. In FIG. 8, UE may correspond to the relay device in FIG. 4b; an SMC corresponds to the first network device in FIG. 4b; an eNodeB may correspond to the access network device.

In the present disclosure, peer protocols between the UE and the eNodeB and peer protocols between the MME and the eNodeB are similar to the corresponding peer protocols in FIG. 7a. Details are not described herein again.

In the present disclosure, in FIG. 4b, bottom-layer protocols of the SMS of the relay device may be specifically NAS, RRC, PDCP, RLC, MAC, and L1 protocols.

Figure 9:
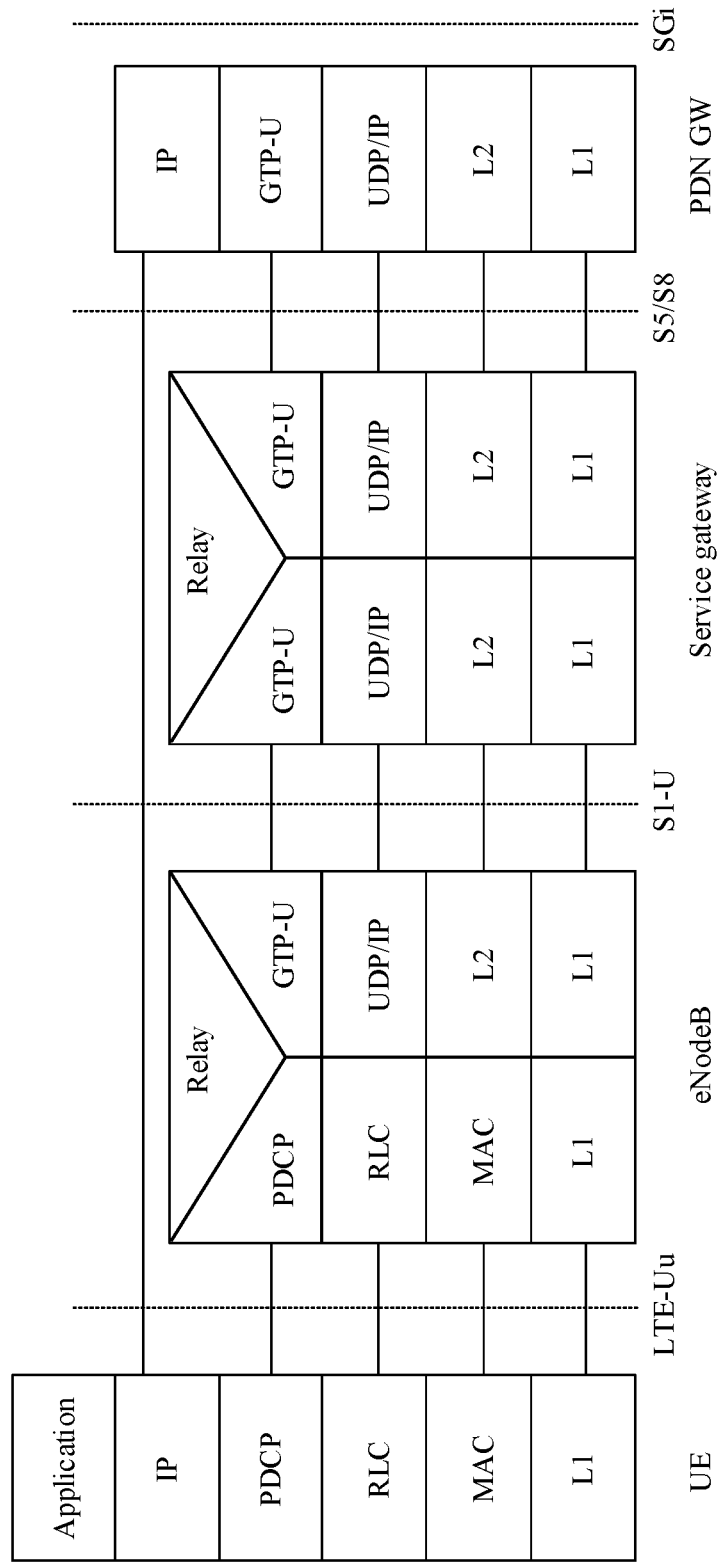
FIG. 9 is yet another block diagram of a system according to the present disclosure.

Based on the system framework shown in FIG. 4c, as shown in FIG. 9, the present disclosure provides a specific protocol framework. Fourth data in the protocol framework is specifically an IP data packet. In FIG. 9, UE may correspond to the relay device in FIG. 4c, a PDN GW corresponds to the first network device in FIG. 4c, and the access network device is an eNodeB.

In the present disclosure, peer protocols between the UE and the eNodeB are PDCP, RLC, MAC, and L1 protocols, and peer protocols between the eNodeB and a serving GW are GTP-U, UDP, IP, L2, and L1 protocols. Peer protocols between the serving GW and the PDN GW are GTP-U, UDP, IP, L2, and L1 protocols.

In the present disclosure, in FIG. 4c, bottom-layer protocols of the IP layer of the relay device may be PDCP, RLC, MAC, and L1 protocols. Bottom-layer protocols of the IP layer of the first network device may be GTP-U, UDP, IP, L2, and L1 protocols, and bottom-layer protocols of the GTP-U layer of the first network device may be UDP, IP, L2, and L1 protocols. An interface between the UE and the eNodeB is LTE-Uu, an interface between the eNodeB and the serving GW is S1-U, and an interface between the serving GW and the PDN GW is S5/S8.

It should be noted that "a plurality of" mentioned in the present disclosure means two or more. Terms such as "first" and "second" described in the present disclosure are used for differentiation only, and are not used to indicate or imply relative importance or a sequence.

In the embodiments of the present disclosure, some scenarios are described by using a 4G network scenario in a wireless communications network as an example. It should be noted that the solutions in the embodiments of the present disclosure may be alternatively applied to another wireless communications network, and a corresponding name may be replaced with a name of a corresponding function in the another wireless communications network.

Based on the system frameworks in FIG. 4a, FIG. 4b, FIG. 4c, FIG. 4d, FIG. 4e, FIG. 4f, FIG. 4g, and FIG. 4h, the present disclosure provides an application scenario. Details are as follows:

The core network device (for example, an HSS) allocates an identifier segment to each vendor of the internet of things device. For example, if internet of things device vendors include a vendor 1, a vendor 2, and a vendor 3, the core network device may allocate an identifier segment 000-110 to the vendor 1, allocate an identifier segment 111-1110 to the vendor 2, and allocate an identifier segment 1111-11110 to the vendor 3. Therefore, in the present disclosure, when producing an internet of things device, each vendor may allocate an identifier to each internet of things device from an address segment pre-obtained from the core network device. For example, an identifier segment pre-obtained by the vendor 1 from the core network device is 000-110. Therefore, the vendor 1 may allocate an identifier 000 to a produced internet of things device A, allocate an identifier 001 to an internet of things device B produced by the vendor 1, and so on. Each internet of things device carries, at delivery, an identifier pre-allocated to the internet of things device.

In the present disclosure, when performing communication by using the method shown in the procedure in FIG. 5 or FIG. 6, the internet of things device may add the identifier to to-be-sent data, and send the data in a broadcast manner. A nearby relay device that receives the data may send the data to a network device by using a user plane connection or a control plane connection between the relay device and the network device. After receiving the data, the network device may determine, based on the identifier of the data, an internet of things vendor that reports the data, and therefore, send the data to a corresponding application server. For example, data of the vendor 1 may be sent to an application server of the vendor 1. The data of the vendor 2 may be sent to an application server of the vendor 2.

In the present disclosure, the internet of things device sends data by using the relay device, and the internet of things device does not need to establish a user plane connection and a control plane connection to the network device, thereby reducing power consumption of the internet of things device. However, when receiving the data, the relay device sends the data by using a connection between the relay device and the network device, and does not need to establish a dedicated connection for the internet of things device. In this way, power consumption of the relay device is also reduced. In addition, the internet of things device directly sends service data in a broadcast manner without establishing a dedicated connection to the relay device, thereby reducing signaling overheads of the internet of things device and the relay device.

In different embodiments, because a time for which a nearby relay device passes may be relatively short, in the present disclosure, service data is directly sent on a broadcast channel without establishing a dedicated connection, so that the internet of things device can transmit the data to a network by using the relay device passing nearby. In addition, with development of the internet of things, a large quantity of internet of things devices need to be connected to a network. Therefore, a large quantity of base stations need to be deployed for support. However, in the manner of the present disclosure, the internet of things device may transmit data by using a relay device, so that a quantity of to-be-deployed base stations can be reduced, and overheads can be reduced.

Figure 10:
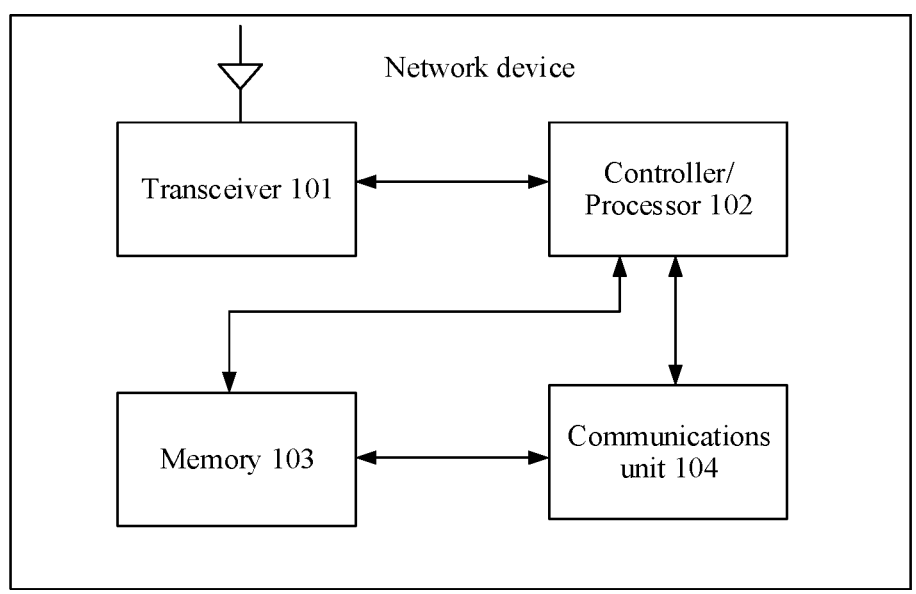
FIG. 10 is a schematic structural diagram of a network device according to the present disclosure.

FIG. 10 is a possible schematic structural diagram of a network device in the foregoing embodiments of the present disclosure. The network device may be the first network device or the second network device in FIG. 4*a*, FIG. 4*b*, FIG. 4*c*, FIG. 4*d*, and FIG. 5, or may be the third network device in FIG. 4*e*, FIG. 4*f*, FIG. 4*g*, FIG. 4*h*, and FIG. 6.

In the present disclosure, the network device includes a transceiver 101 and a controller/processor 102. The transceiver 101 may be configured to support information reception and transmission between the network device and the terminal device in the foregoing embodiments, and support radio communication between a base station and another network device.

The controller/processor 102 is configured to perform various functions for communicating with the terminal device and the network device. In an uplink, an uplink signal from the terminal device is received by using an antenna, is demodulated by the transceiver 101, and is further processed by the controller/processor 102 to restore service data and signaling information that are sent by the terminal device. In a downlink, service data and a signaling message are processed by the controller/processor 102 and are demodulated by the transceiver 101 to generate a downlink signal, and the downlink signal is transmitted to UE by using the antenna. The controller/processor 102 is further configured to: perform the communication method described in the foregoing embodiments, to process the fourth data and obtain second data when determining that the fourth data includes a third indication; process the second data, to obtain third data and an identifier of a first terminal device; and determine, based on the identifier of the first terminal device, the first terminal device that reports the second data. The controller/processor 102 is further configured to perform a processing process that relates to the network device in FIG. 5 or FIG. 6 and/or another process used for technologies described in the present disclosure. The network device may further include a memory 103, and the memory 103 may be configured to store program code and data of the network device. The network device may further include a communications unit 104, configured to support the base station in communicating with another network entity, for example, configured to support the network device in communicating with the second terminal device shown in FIG. 5 or FIG. 6.

It may be understood that FIG. 10 shows only a simplified design of the network device. In different embodiments, the network device may include any quantity of transmitters, receivers, processors, controllers, memories, communications units, and the like, and all base stations that can implement the present disclosure fall within the protection scope of the present disclosure.

Figure 11:
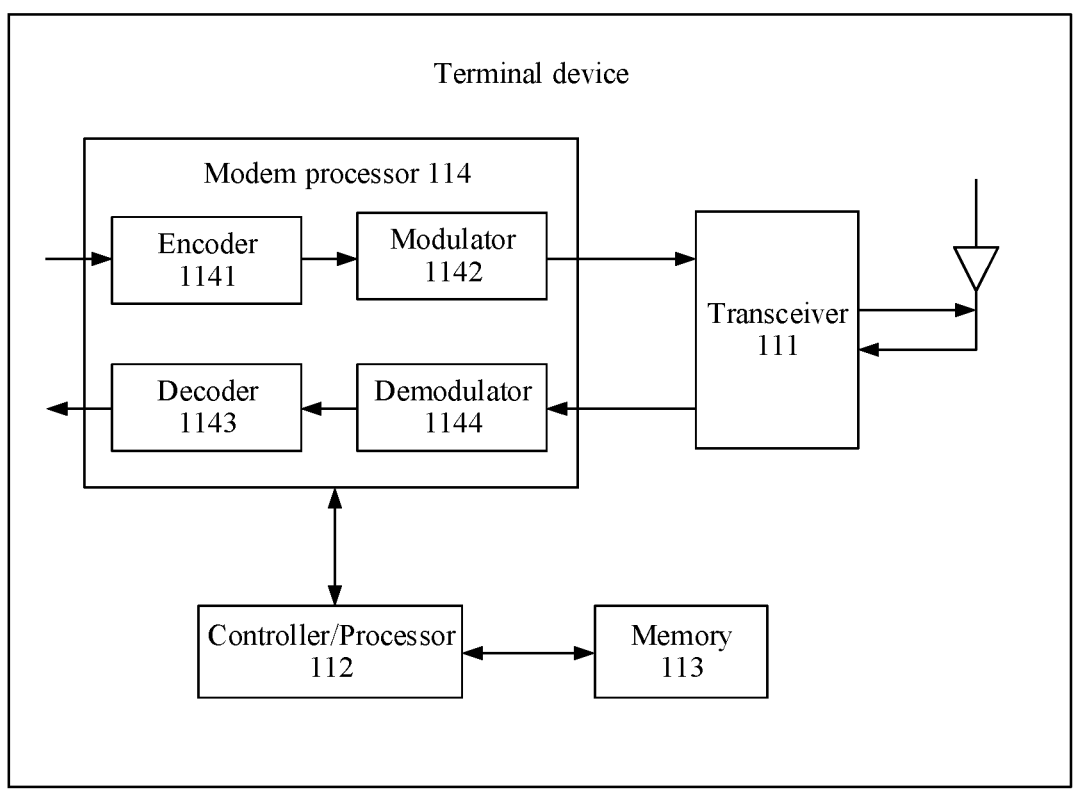
FIG. 11 is a schematic structural diagram of a terminal device according to the present disclosure.

FIG. 11 is a simplified schematic diagram of one embodiment structure of a terminal device in an embodiment of the present disclosure. The terminal device may be one of the terminal devices in FIG. 1 to FIG. 6. The terminal device includes a transceiver 111 and a controller/processor 112, and may further include a memory 113 and a modem processor 114.

The transceiver 111 adjusts (for example, analog-converts, filters, amplifies, and up-converts) the output sample and generates an uplink signal. The uplink signal is transmitted to the network device in the foregoing embodiments by using an antenna. In a downlink, an antenna receives a downlink signal transmitted by the network device in the foregoing embodiments. The transceiver 111 adjusts (for example, filters, amplifies, down-converts, and digitizes) a signal received from the antenna, and provides an input sample. In the modem processor 114, an encoder 1141 receives service data and a signaling message that are to be sent in an uplink, and processes (for example, formats, encodes, and interleaves) the service data and the signaling message. A modulator 1142 performs further processing (for example, symbol mapping and modulation) on encoded service data and an encoded signaling message, and provides an output sample. A decoder 1143 processes (for example, de-interleaves and decodes) the symbol estimation and provides decoded data and a decoded signaling message that are to be sent to the terminal device. A demodulator 1144 processes (for example, demodulates) the input sample, and provides symbol estimation. The encoder 1141, the modulator 1142, the decoder 1143, and the demodulator 1144 may be implemented by the combined modem processor 114. These units perform processing based on a wireless technology (for example, an access technology in LTE or another evolved system) used in a radio access network.

The controller/processor 112 controls and manages an action of the terminal device and is configured to perform processing performed by the terminal device in the foregoing embodiments. For example, the terminal device may be the first terminal device and the second terminal device, and the first terminal device may generate the first data, and send the first data to the second terminal device when a connection to the network device is not established. The second terminal device may process the first data to obtain second data, and process the second data, to obtain fourth data, and send the fourth data to the first network device by using the first connection. In an example, the controller/processor 112 may be configured to support the terminal device in performing the content related to the terminal device in FIG. 5 or FIG. 6. The memory 113 is configured to store program code and data used for the terminal device.

Figure 12:
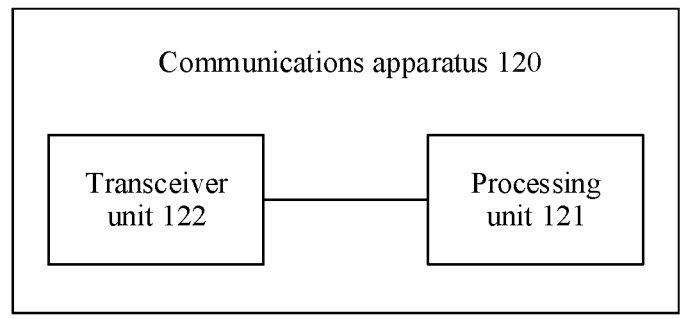
FIG. 12 to FIG. 16 are schematic structural diagrams of a communications apparatus according to the present disclosure.

The present disclosure further provides a communications apparatus. The communications apparatus may be the first terminal device in FIG. 5 or FIG. 6. As shown in FIG. 12, the communications apparatus 120 includes:

- a processing unit 121, configured to generate first data, where the first data includes second data, the second data includes third data and an identifier of the first terminal device, the second data is data that needs to be reported by the first terminal device to a network device, and the identifier of the first terminal device is used to determine the first terminal device; and
- a transceiver unit 122, configured to send the first data to a second terminal device when a connection to the network device is not established.

In the present disclosure, the generating, by the first terminal device, first data includes: encapsulating, by the first terminal device, the third data by using a first protocol, to generate the second data, where the first protocol is a transmission management layer TML protocol or a non-access stratum NAS protocol; and encapsulating, by the first terminal device, the second data by using a second protocol, to generate the first data, where the second protocol is at least one of an adaptor layer protocol and an access stratum protocol.

In the present disclosure, the first data further includes a first indication, the first indication is used to indicate a manner in which the second terminal device sends the second data, and the manner is at least one of a non-access stratum NAS signaling manner, a short message service SMS manner, and an IP data packet manner.

In the present disclosure, the first data further includes a second indication, and the second indication is used to indicate a maximum allowable delay time for sending the second data by the second terminal device.

In the present disclosure, the sending, by the first terminal device, the first data to a second terminal device when a connection to the network device is not established includes: sending, by the first terminal device, the first data to the second terminal device by using a broadcast channel when the connection to the network device is not established.

In the present disclosure, the identifier of the first terminal device is pre-allocated by a core network device to the first terminal device. The second data further includes an SN sequence number, and the SN sequence number is used to identify the second data. The second data further includes a check value, and the check value is used to check whether the second data is modified in a process of transmitting the second data to the network device. The first data further includes a public land mobile network PLMN identifier of the first terminal device.

For descriptions and specific beneficial effects of performing the communication method by the communications apparatus, refer to descriptions of the first terminal device in FIG. 5 or FIG. 6 and related literary records in the foregoing embodiments. Details are not described herein again.

Figure 13:
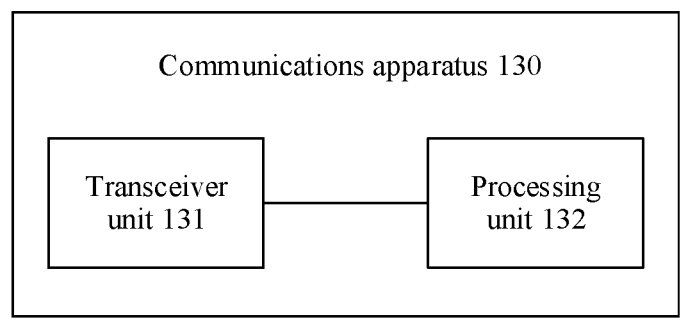

The present disclosure further provides another communications apparatus. As shown in FIG. 13, the communications apparatus 130 may correspond to the second terminal device in FIG. 5 or FIG. 6, and includes:

- a transceiver unit 131, configured to: receive first data sent by a first terminal device, where the first data includes second data, the second data includes third data and an identifier of the first terminal device, the second data is data that needs to be reported by the first terminal device to a network device, and the identifier of the first terminal device is used to determine the first terminal device; and
- a processing unit 132, configured to: process the first data, to obtain the second data; process the second data, to obtain fourth data, where the fourth data includes the second data and a third indication; and send the fourth data to a first network device by using a first connection, where the first connection is a connection between the second terminal device and the first network device, and the third indication is used to instruct the first network device to send the second data to a second network device; or send the fourth data to a third network device by using a second connection, where the second connection is a connection between the second terminal device and the third network device, and the third indication is used to indicate that the fourth data includes the second data.

In the present disclosure, the first data further includes a first indication, the first indication is used to indicate a manner in which the second terminal device sends the second data, and the manner is at least one of a NAS signaling manner, an SMS manner, and an IP data packet manner; and when processing the second data, to obtain the fourth data, the processing unit 132 is specifically configured to: when the first indication is the NAS signaling manner, process the second data based on a NAS protocol, to generate the fourth data, where the fourth data is NAS signaling; when the first indication is the SMS manner, process the second data based on an SMS protocol, to generate the fourth data, where the fourth data is an SMS; or when the first indication is the IP data packet manner, process the second data based on an IP protocol, to generate the fourth data, where the fourth data is an IP data packet.

In the present disclosure, the first connection is a control plane connection between the second terminal device and the first network device, and the control plane connection is used to transmit at least one of NAS signaling and an SMS; and when sending the fourth data to the first network device by using the first connection, the transceiver unit 131 is specifically configured to: send the fourth data to the first network device by using the control plane connection, where the fourth data is the NAS signaling or the SMS.

In the present disclosure, the first connection is a user plane connection between the second terminal device and the first network device, and the user plane connection is used to transmit the IP data packet; and when sending the fourth data to the first network device by using the first connection, the transceiver unit 131 is specifically configured to: send the fourth data to the first network device by using the first connection, where the fourth data is the IP data packet.

In the present disclosure, the first data further includes a second indication, and the second indication is used to indicate a maximum allowable delay time for sending the second data by the second terminal device; and when sending the fourth data to the first network device by using the first connection, the transceiver unit 131 is specifically configured to: send, by using the first connection, the fourth data including the second data to the first network device within the maximum allowable delay time indicated by the second indication.

In the present disclosure, the second connection is a control plane connection between the second terminal device and the third network device, and the control plane connection is used to transmit at least one of the NAS signaling and the SMS; and when sending the fourth data to the third network device by using the second connection, the transceiver unit 131 is specifically configured to: send the fourth data to the third network device by using the control plane connection, where the fourth data is the NAS signaling or the SMS.

In the present disclosure, the second connection is a user plane connection between the second terminal device and the third network device, and the user plane connection is used to transmit the IP data packet; and when sending the fourth data to the third network device by using the second connection, the transceiver unit 131 is specifically configured to: send the fourth data to the third network device by using the user plane connection, where the fourth data is the IP data packet.

In the present disclosure, the first data further includes a second indication, and the second indication is used to indicate a maximum allowable delay time for sending the second data by the second terminal device; and when sending the fourth data to the third network device by using the second connection, the transceiver unit 131 is specifically configured to: send, by using the second connection, the fourth data including the second data to the third network device within the maximum allowable delay time indicated by the second indication.

In the present disclosure, the first data further includes a PLMN identifier of the first terminal device; and when sending the fourth data to the third network device by using the second connection, the transceiver unit 131 is specifically configured to: when the PLMN identifier of the first terminal device included in the first data and a PLMN identifier of the second terminal device meet a preset condition, send the fourth data to the third network device by using the second connection.

In the present disclosure, the receiving, by the transceiver unit 131, first data sent by a first terminal device specifically includes: receiving, on a broadcast channel, the first data sent by the first terminal device.

For descriptions and specific beneficial effects of performing the communication method by the communications apparatus, refer to descriptions of the second terminal device in FIG. 5 or FIG. 6 and related literary records in the foregoing embodiments. Details are not described herein again.

Figure 14:
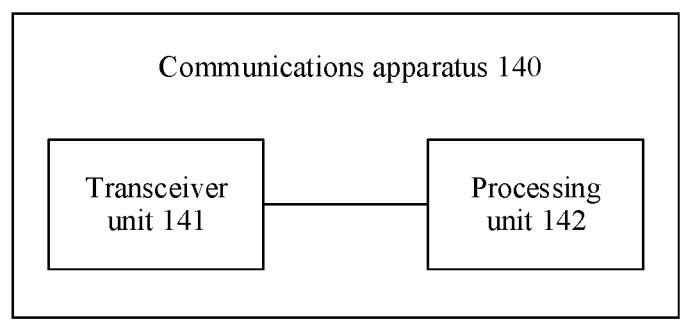

The present disclosure further provides a communications apparatus. As shown in FIG. 14, the communications apparatus 140 may correspond to the first network device in FIG. 5, and includes:
  a transceiver unit 141, configured to: receive, by using a first connection, fourth data sent by a second terminal device, where the first connection is a connection between the second terminal device and a first network device; and send fifth data to a second network device; and
  a processing unit 142, configured to generate the fifth data when determining that the fourth data includes a third indication, where the fifth data includes the second data, the second data includes third data and an identifier of the second terminal device, the second data is data that needs to be reported by a first terminal device to a network device, the identifier of the second terminal device is used to determine the first terminal device that reports the second data, and the third indication is used to instruct the first network device to send the second data to the second network device.

In the present disclosure, the first connection is a control plane connection between the second terminal device and the first network device, and the control plane connection is used to transmit at least one of NAS signaling and an SMS message; and
  the receiving, by the transceiver unit 141 by using a first connection, fourth data sent by a second terminal device includes: receiving, by using the control plane connection, the fourth data sent by the second terminal device, where the fourth data is the NAS signaling or the SMS.

In the present disclosure, the first connection is a user plane connection between the second terminal device and the first network device, and the user plane connection is used to transmit an IP data packet; and the receiving, by the transceiver unit 141 by using a first connection, fourth data sent by a second terminal device includes: receiving, by using the user plane connection, the fourth data sent by the second terminal device, where the fourth data is the IP data packet.

In the present disclosure, the fifth data further carries location information of the second terminal device and/or an identifier of the second terminal device, and the location information includes at least one of a cell global identity, latitude and longitude information, a route update area, and a tracking area of the second terminal device.

For descriptions and specific beneficial effects of performing the communication method by the communications apparatus, refer to descriptions about the first network device in FIG. 5 and related literary records. Details are not described herein again.

Figure 15:
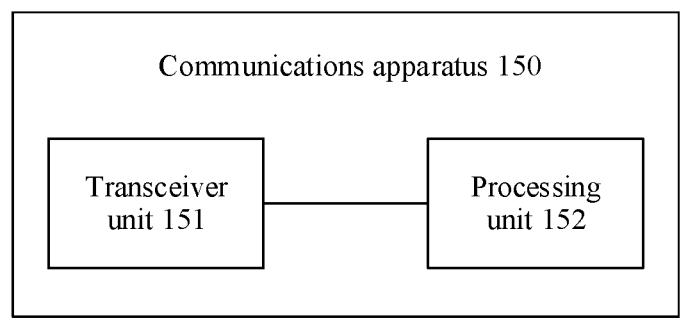

The present disclosure further provides another communications apparatus. As shown in FIG. 15, the communications apparatus 150 may correspond to the second network device in FIG. 5, and includes:
  a transceiver unit 151, configured to receive fifth data sent by a first network device, where the fifth data includes second data, the second data includes third data and an identifier of a first terminal device, the second data is data that needs to be reported by the first terminal device to the second network device, and the identifier of the first terminal device is used to determine the first terminal device; and a processing unit 152, configured to: process the fifth data, to obtain the second data; process the second data, to obtain the third data and the identifier of the first terminal device; and determine, based on the identifier of the first terminal device, the first terminal device that reports the second data.

In the present disclosure, when processing the fifth data, to obtain the second data, the processing unit 152 is specifically configured to: process the fifth data by using a third protocol, to obtain the second data, where the third protocol includes at least one of a GPRS tunneling protocol-user panel GTP-U protocol, a user datagram protocol UDP, and an IP protocol.

In the present disclosure, the processing, by the processing unit 152, the second data, to obtain the third data and the identifier of the first terminal device includes: processing the second data by using a first protocol, to obtain the third data and the identifier of the first terminal device, where the first protocol is a TML protocol or a NAS protocol.

In the present disclosure, the fifth data further includes location information of the second terminal device and/or an identifier of the second terminal device, and the location information includes at least one of a cell global identity, latitude and longitude information, a route update area, and a tracking area of the second terminal device.

In the present disclosure, the transceiver unit 151 is further configured to: report the third data in the second data to an application server corresponding to the first terminal device after determining the first terminal device that reports the second data.

In the present disclosure, the second data further includes an SN sequence number, and the SN sequence number is used to identify the second data; and when reporting the third data in the second data to the application server corresponding to the first terminal device after determining the first terminal device that reports the second data, the transceiver unit 151 is specifically configured to: determine, based on the SN sequence number and an identifier of a second terminal device after determining the first terminal device that reports the second data, whether the second data is repeatedly received; report the third data to the application server corresponding to the first terminal device when determining that the second data is not repeatedly received; and discard the second data when determining that the second data is repeatedly received.

In the present disclosure, the fifth data further includes a check value, and the check value is used to check whether the second data included in the fifth data is modified in a process of transmitting the second data from the first terminal device to the second network device;

when reporting the third data in the second data to the application server corresponding to the first terminal device after determining the first terminal device that reports the second data, the transceiver unit 151 is specifically configured to: check, based on the check value after determining the first terminal device that reports the second data, whether the second data is modified in a process of transmitting the second data from the first terminal device to the second network device; and report the third data to the application server corresponding to the first terminal device when determining that the second data is not modified.

For descriptions and specific beneficial effects of performing the communication method by the communications apparatus, refer to descriptions of the second network device in FIG. 5 and related literary records. Details are not described herein again.

Figure 16:
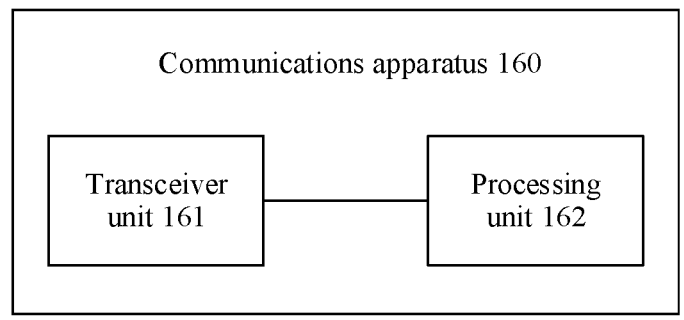

The present disclosure further provides another communications apparatus. As shown in FIG. 16, the communications apparatus 160 may correspond to the third network device in FIG. 6, and includes:
 a transceiver unit 161, configured to receive, by using a second connection, fourth data sent by a second terminal device, where the second connection is a connection between the second terminal device and the third network device; and
 a processing unit 162, configured to process the fourth data, and obtain second data when determining that the fourth data includes a third indication, where the second data is data that needs to be reported by a first terminal device to the third network device; process the second data, to obtain third data and an identifier of the first terminal device, where the identifier of the first terminal device is used to determine the first terminal device, and the third indication is used to indicate that the fourth data includes the second data; and determine, based on the identifier of the first terminal device, the first terminal device that reports the second data.

In the present disclosure, when processing the fourth data, and obtaining second data when determining that the fourth data includes the third indication, the processing unit 162 is specifically configured to: process the fourth data by using a fourth protocol, to determine whether the fourth data includes the third indication, where the fourth protocol includes at least one of a UDP protocol, an IP protocol, and a NAS protocol; and obtain the second data from the fourth data when determining that the fourth data includes the third indication.

In the present disclosure, when processing the second data, to obtain the third data and the identifier of the first terminal device, the processing unit 162 is specifically configured to: process the second data by using a first protocol, to obtain the third data and the identifier of the first terminal device, where the first protocol is a TML protocol or a NAS protocol.

In the present disclosure, the second connection is a control plane connection between the third network device and the second terminal device, and the control plane connection is used to transmit at least one of NAS signaling and an SMS; and when receiving, by using the second connection, the fourth data sent by the second terminal device, the transceiver unit 161 is specifically configured to: receive the fourth data by using the control plane connection, where the fourth data is the NAS signaling or the SMS.

In the present disclosure, the second connection is a user plane connection between the third network device and the second terminal device, and the user plane connection is used to transmit an IP data packet; and when receiving, by using the second connection, the fourth data sent by the second terminal device, the transceiver unit 161 is specifically configured to: receive the fourth data by using the user plane connection, where the fourth data is the IP data packet.

In the present disclosure, the transceiver unit 161 is further configured to: report the third data in the second data to an application server corresponding to the first terminal device after determining the first terminal device that reports the second data.

In the present disclosure, the second data further includes an SN sequence number, and the SN sequence number is used to identify the second data; and
 when reporting the third data included in the second data to the application server corresponding to the first terminal device after determining the first terminal device that reports the second data, the transceiver unit 161 is specifically configured to: determine, based on the SN sequence number and an identifier of a second terminal device after determining the first terminal device that reports the second data, whether the second data is repeatedly received; report the third data to the corresponding application server when determining that the second data is not repeatedly received; and discard the second data when determining that the second data is repeatedly received.

In the present disclosure, the second data further includes a check value, and the check value is used to check whether the second data is modified in a process of transmitting the second data from the first terminal device to the third network device; and when reporting the third data in the second data to the application server corresponding to the first terminal device after determining the first terminal device that reports the second data, the transceiver unit 161 is specifically configured to: check, based on the check value in the second data after determining the first terminal device that reports the second data, whether the second data is modified in a process of transmitting the second data from the first terminal device to the second network device; and report the third data in the second data to the application server corresponding to the first terminal device when determining that the second data is not modified.

For descriptions and specific beneficial effects of performing the paging method by the communications apparatus, refer to descriptions of the third network device in FIG. 6 and related literary records in the foregoing embodiments. Details are not described herein again.

The present disclosure further provides a computer-readable storage medium, configured to store a computer program. The computer program is used to execute an instruction of any communication method shown in the foregoing embodiments.

All or some of the foregoing embodiments may be implemented by means of software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present disclosure are all or partially generated. The computer may be a general-purpose computer, a dedicated computer, a computer network, or other programmable apparatuses. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible to the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

A person skilled in the art should understand that the embodiments of the present disclosure may be provided as a method, a system, or a computer program product. Therefore, the present disclosure may use a form of a hardware-only embodiment, a software-only embodiment, or an embodiment with a combination of software and hardware. Moreover, the present disclosure may use a form of a computer program product that is implemented on one or more computer-usable storage media (including but not limited to a disk memory, a CD-ROM, an optical memory, and the like) that include computer usable program code.

The present disclosure is described with reference to the flowcharts and/or the block diagrams of the method, the device (system), and the computer program product in the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a specific function in one or more processes in the flowcharts and/or in one or more blocks in the block diagrams.

These computer program instructions may also be stored in a computer-readable memory that can instruct the computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and operations are performed on the computer or another programmable device, to generate computer-implemented processing. Therefore, the instructions executed on the computer or the another programmable device provide operations for implementing a specific function in one or more processes in the flowcharts and/or in one or more blocks in the block diagrams.

Obviously, a person skilled in the art can make various modifications and variations to the present disclosure without departing from the spirit and scope of the present disclosure. In this way, the present disclosure is intended to cover these modifications and variations of the present disclosure provided that they fall within the scope of the claims of the present disclosure and equivalent technologies thereof

What is claimed is:

1. A communications apparatus, comprising:
a processor, configured to generate first data, wherein the first data comprises second data, the second data comprises third data and an identifier of a first terminal device, the second data is data that needs to be reported by the first terminal device to a network device, and the identifier of the first terminal device is used to determine the first terminal device; and
a transceiver, configured to send the first data to a second terminal device when a connection to the network device is not established.

2. The apparatus according to claim 1, wherein when generating the first data, the processor is specifically configured to:
encapsulate the third data by using a first protocol, to generate the second data, wherein the first protocol is a transmission management layer (TML) protocol or a non-access stratum (NAS) protocol; and
encapsulate the second data by using a second protocol, to generate the first data, wherein the second protocol is at least one of an adaptor layer protocol and an access stratum protocol.

3. The apparatus according to claim 1, wherein the first data further comprises a first indication, the first indication is used to indicate a manner in which the second terminal device sends the second data, and the manner is at least one of a non-access stratum (NAS) signaling manner, a short message service (SMS) manner, and an IP data packet manner.

4. The apparatus according to claim 1, wherein the first data further comprises a second indication, and the second indication is used to indicate a maximum allowable delay time for sending the second data by the second terminal device.

5. The apparatus according to claim 1, wherein the sending, by a transceiver, the first data to a second terminal device when a connection to the network device is not established comprises:
sending, by the transceiver, the first data to the second terminal device by using a broadcast channel when the connection to the network device is not established.

6. The apparatus according to claim 1, wherein the identifier of the first terminal device is pre-allocated by a core network device to the first terminal device.

7. The apparatus according to claim 1, wherein the second data further comprises an SN sequence number, and the SN sequence number is used to identify the second data.

8. The apparatus according to claim 1, wherein the second data further comprises a check value, and the check value is used to check whether the second data is modified in a process of transmitting the second data to the network device.

9. A second terminal device, comprising:
a transceiver, configured to: receive first data sent by a first terminal device, and send fourth data to a first network device by using a first connection, or send fourth data to a third network device by using a second connection, wherein the first data comprises second data, the second data comprises third data and an identifier of the first terminal device, the second data is data that needs to be reported by the first terminal device to a network device, the identifier of the first terminal device is used to determine the first terminal device, the first connection is a connection between the second terminal device and the first network device, the second connection is a connection between the second terminal device and the third network device, and a third indication is used to instruct the first network device to send the second data to a second network device, or a third indication is used to indicate that the fourth data comprises the second data; and
a processor, configured to: process the first data, to obtain the second data, and process the second data, to obtain the fourth data, wherein the fourth data comprises the second data and the third indication.

10. The device according to claim 9, wherein the first data further comprises a first indication, the first indication is used to indicate a manner in which the second terminal device sends the second data, and the manner is at least one of a NAS signaling manner, an SMS manner, and an IP data packet manner; and
when processing the second data, to obtain the fourth data, the processor is specifically configured to:
when the first indication is the NAS signaling manner, process the second data based on a NAS protocol, to generate the fourth data, wherein the fourth data is NAS signaling;
when the first indication is the SMS manner, process the second data based on an SMS protocol, to generate the fourth data, wherein the fourth data is an SMS; or
when the first indication is the IP data packet manner, process the second data based on an IP protocol, to generate the fourth data, wherein the fourth data is an IP data packet.

11. The device according to claim 9, wherein the first connection is a control plane connection between the second terminal device and the first network device, and the control plane connection is used to transmit at least one of the NAS signaling and the SMS; and
when sending the fourth data to the first network device by using the first connection, the transceiver is specifically configured to:
send the fourth data to the first network device by using the control plane connection, wherein the fourth data is the NAS signaling or the SMS.

12. The device according to claim 9, wherein the first connection is a user plane connection between the second terminal device and the first network device, and the user plane connection is used to transmit an IP data packet; and
when sending the fourth data to the first network device by using the first connection, the transceiver is specifically configured to:
send the fourth data to the first network device by using the first connection, wherein the fourth data is the IP data packet.

13. The device according to claim 9, wherein the first data further comprises a second indication, and the second indication is used to indicate a maximum allowable delay time for sending the second data by the second terminal device; and
when sending the fourth data to the first network device by using the first connection, the transceiver is specifically configured to:
send, by using the first connection, the fourth data comprising the second data to the first network device within the maximum allowable delay time indicated by the second indication.

14. The device according to claim 9, wherein the second connection is a control plane connection between the second terminal device and the third network device, and the control plane connection is used to transmit at least one of the NAS signaling and the SMS; and
when sending the fourth data to the third network device by using the second connection, the transceiver is specifically configured to:
send the fourth data to the third network device by using the control plane connection, wherein the fourth data is the NAS signaling or the SMS.

15. The device according to claim 9, wherein the second connection is a user plane connection between the second terminal device and the third network device, and the user plane connection is used to transmit an IP data packet; and
when sending the fourth data to the third network device by using the second connection, the transceiver is specifically configured to:

send the fourth data to the third network device by using the user plane connection, wherein the fourth data is the IP data packet.

16. The device according to claim 9, wherein the first data further comprises a second indication, and the second indication is used to indicate a maximum allowable delay time for sending the second data by the second terminal device; and when sending the fourth data to the third network device by using the second connection, the transceiver is specifically configured to:

send, by using the second connection, the fourth data comprising the second data to the third network device within the maximum allowable delay time indicated by the second indication.

17. The device according to claim 9, wherein when receiving the first data sent by the first terminal device, the transceiver is specifically configured to:

receive, on a broadcast channel, the first data sent by the first terminal device.

18. A first network device, comprising:

a transceiver, configured to: receive, by using a first connection, fourth data sent by a second terminal device and send fifth data to a second network device, wherein the first connection is a connection between the second terminal device and a first network device; and a processor, configured to generate fifth data when determining that the fourth data comprises a third indication, wherein the fifth data comprises second data, the second data comprises third data and an identifier of the second terminal device, the second data is data that needs to be reported by a first terminal device to a network device, the identifier of the second terminal device is used to determine the first terminal device that reports the second data, and the third indication is used to instruct the first network device to send the second data to the second network device.

19. The device according to claim 18, wherein the first connection is a control plane connection between the second terminal device and the first network device, and the control plane connection is used to transmit at least one of NAS signaling and an SMS message; and when receiving, by using the first connection, the fourth data sent by the second terminal device, the transceiver is specifically configured to:

receive, by using the control plane connection, the fourth data sent by the second terminal device, wherein the fourth data is the NAS signaling or the SMS.

20. The device according to claim 18, wherein the first connection is a user plane connection between the second terminal device and the first network device, and the user plane connection is used to transmit an IP data packet; and when receiving, by using the first connection, the fourth data sent by the second terminal device, the transceiver is specifically configured to:

receive, by using the user plane connection, the fourth data sent by the second terminal device, wherein the fourth data is the IP data packet.

* * * * *